(12) United States Patent
Ishii et al.

(10) Patent No.: US 7,309,666 B2
(45) Date of Patent: *Dec. 18, 2007

(54) METHOD FOR MAKING A SILICONE COATED FABRIC

(75) Inventors: Hideaki Ishii, Ashiya (JP); Toshirou Nagaoka, Nobeoka (JP)

(73) Assignee: Asahi Kasei Kabushiki Kaisha, Osaka-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/359,403

(22) Filed: Feb. 23, 2006

(65) Prior Publication Data

US 2006/0194007 A1 Aug. 31, 2006

Related U.S. Application Data

(62) Division of application No. 10/257,151, filed as application No. PCT/JP01/08834 on Oct. 5, 2001, now abandoned.

(30) Foreign Application Priority Data

Feb. 1, 2001 (JP) ............................ 2001-26103
May 1, 2001 (JP) ............................ 2001-134396

(51) Int. Cl.
    *B32B 27/12* (2006.01)

(52) U.S. Cl. .................. 442/157; 442/76; 442/203; 442/208; 442/218; 427/389.9; 427/412; 427/387; 57/204; 57/206

(58) Field of Classification Search .............. 442/76, 442/157, 203, 208, 218; 428/34.3, 34.5, 428/34.7, 447; 427/389.9, 412, 387; 280/728.1; 3/383; 106/2; 57/204, 206, 243, 244; 524/730, 524/837, 861, 862; 528/15, 31, 32; 525/479

See application file for complete search history.

(56) References Cited

U.S. PATENT DOCUMENTS 5,989,660 A 11/1999 Moriwaki et al.
6,037,279 A 3/2000 Brookman et al.

(Continued)

FOREIGN PATENT DOCUMENTS

EP 0 558 762 A1 9/1993

(Continued)

*Primary Examiner*—Arti Singh
(74) *Attorney, Agent, or Firm*—Finnegan, Henderson, Farabow, Garrett, & Dunner, L.L.P.

(57) ABSTRACT

A silicone coated fabric having a base woven fabric that is formed from a synthetic fiber weaving yarn that has a yarn size of from 100 to 270 dtex, and a weaving size expressed by product calculated by multiplying the yarn size of a weaving yarn and a weave density (ends or picks/2.54 cm) of from 10,000 to 25,000 (dtex·ends (or picks)/2.54 cm) in both the warp direction and the weft direction, a silicone being applied to the woven fabric in an amount of from 5 to 25 g/m², and having on one side a uniform silicone coating layer forming part of the silicone mentioned above. The silicone coated fabric is a lightweight coated fabric that shows improved heat resistance, improved flexibility and an improved low coefficient of friction as well as particularly improved burning resistance. The fabric can therefore be used for producing lightweight and compactly storable airbags that suppress bursting starting from a burnt-through-hole, and that shorten a deployment time.

12 Claims, 4 Drawing Sheets

U.S. PATENT DOCUMENTS

| | | |
|---|---|---|
| 6,177,366 B1 | 1/2001 | Li |
| 6,458,725 B1 | 10/2002 | Masuda et al. |
| 6,734,124 B2 | 5/2004 | Hurst et al. |
| 6,759,355 B2 | 7/2004 | Nagaoka et al. |
| 2002/0155774 A1 | 10/2002 | Kitamura et al. |
| 2003/0060103 A1 | 3/2003 | Nagaoka et al. |

FOREIGN PATENT DOCUMENTS

| | | |
|---|---|---|
| EP | 0 663 468 A1 | 7/1995 |
| EP | 0 669 419 A1 | 8/1995 |
| EP | 0 953 675 A2 | 11/1999 |
| EP | 0 972 789 A1 | 1/2000 |
| EP | 0 1 033 292 A1 | 9/2000 |
| JP | 05319194 A1 | 3/1993 |
| JP | 07195990 | 8/1995 |
| JP | 073000774 A | 11/1995 |
| JP | 11001876 A | 1/1999 |
| JP | 11293540 | 10/1999 |
| JP | 11350361 | 12/1999 |
| JP | 2000234273 A | 8/2000 |
| JP | 2001138849 A | 5/2001 |
| WO | WO 01/12895 A1 | 2/2001 |
| WO | WO 01/09416 A1 | 8/2001 |

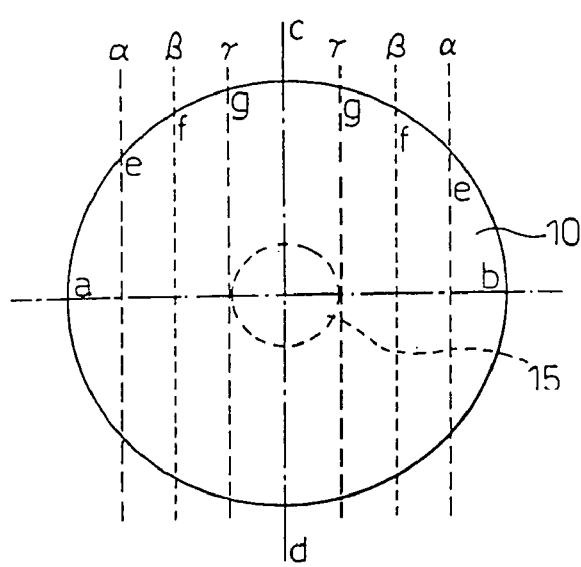
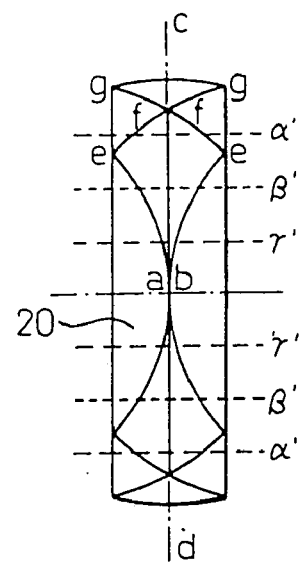
Fig. 1(A)  Fig. 1(B)
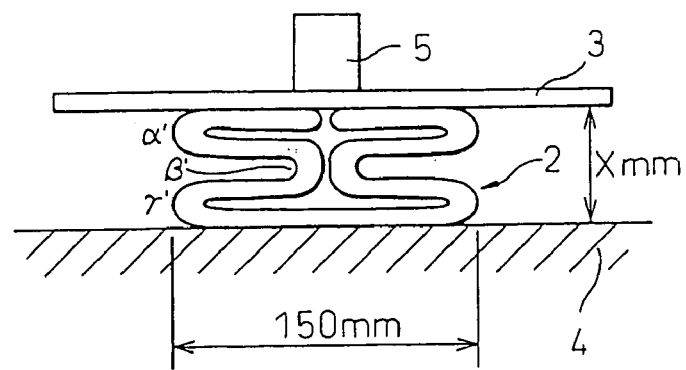
Fig. 2

METHOD FOR MAKING A SILICONE COATED FABRIC

RELATED APPLICATIONS

This application is a divisional of application Ser. No. 10/257,151 filed Oct. 9, 2002, now abandoned, which is a §371 of PCT/JP01/08834 filed Oct. 5, 2001, the contents of both of which are incorporated herein by reference.

TECHNICAL FIELD

The present invention relates to a soft and lightweight silicone coated fabric excellent in burning resistance and mechanical properties, a method of producing the same, and an airbag prepared therefrom.

BACKGROUND ART

An airbag provided to ensure the safety of an occupant in an automobile at the time of collision is usually mounted in a small space such as a steering wheel or an instrument panel in the form of a module in which the airbag is stored in combination with an inflator. In order for a passenger car to be prepared against a side crash, an airbag has recently been provided in the form a side bag or side curtain. An airbag in such a varied form is also stored in a small space such as a side portion of a car sheet or a roof/pillar portion. In order to ensure ample occupant space in a car, without reducing it under such circumstances, it is required to make the stowed volume of the airbag as small as possible and, further, to make the airbag system light.

In order to make the airbag compact and lightweight to meet the requirements, a base fabric for airbag that is a lightweight woven fabric is required.

In order to make the stowed volume of an airbag small, a weaving yarn having a small yarn size has been used as a yarn for the woven fabric. In order to make an airbag airtight, the type and amount of an elastomer to be applied to the base woven fabric have been adjusted. For example, the size of a yarn to be used for the woven fabric is decreased from 940 dtex to 470 dtex. Moreover, the elastomer has been changed from chloroprene to silicone, and the coating amount has been decreased, from 90 to 120 g/m², to from 40 to 60 g/m². A coated fabric prepared by coating a base woven fabric having a yarn size of 470 dtex with a silicone resin is currently being used.

Recently, airbags have been required to be even more lightweight and compact. Accordingly, references such as WO 01/09416 disclose the use of a weaving yarn having a smaller yarn size (from 67 to 250 dtex) for the purpose of making a woven fabric for an airbag more lightweight, and the use of a weaving yarn having a smaller size filament (single filament size of from 0.5 to 4.5 dtex) for the purpose of making the airbags compact or making the woven fabric give a soft feel.

On the other hand, in order to make the coated fabric lightweight, it is desired that the coating amount is decreased. However, when the coating amount of silicone is decreased, the burning speed increases, and a problem, that the burning speed exceeds the upper limit that FMVSS 302 regulation specifies, arises. For example, Japanese Unexamined Patent Publication (Kokai) No. 7-300774 discloses the production of a coated fabric that passes the flame proofness test, which comprises coating a fabric with a mixture prepared by adding solid powder of a substance such as acetylene black and $Fe_2O_3$ to silicone. However, the coated fabric is not lightweight, because the coating disclosed has a thickness from 5 to 20 μm. Moreover, when powder of a substance such as acetylene black or $Fe_2O_3$ is added to a silicone composition in an amount of from 5 to 10 mass parts as a solid component, the solid powder cannot be sufficiently mixed with silicone. As a result, the following problems arise: the operator or the surroundings is contaminated with solid powder that drops off the coating during handling; solid powder that scatters during sewing an airbag clogs the eye of a sewing needle, and the sewing machine must be frequently repaired. When a solid powder accumulates in the eye portion of a sewing needle and/or thread guides, there is a possibility that a critical problem takes place in the step of sewing with an industrial high speed sewing machine due to a variation in the tension of feeding a sewing yarn. A variation in the tension of feeding a sewing yarn destroys the balance between the tension of a needle thread and that of a bobbin thread, resulting in the formation of a grinning seam to vary the thickness of an airbag product. Moreover, the tension of the running yarn is varied to damage the sewing yarn or to produce a yarn break. As a result, a problem, that the reliability of the airbag deployability might be impaired, arises.

Japanese Unexamined Patent Publication (Kokai) No. 2001-138849 describes a lightweight coated fabric with excellent stowability that is prepared from a woven fabric formed from a yarn with a yarn size of from 100 to 250 denier and coated with a silicone rubber in an amount of from 5 to 35 g/m², and that can prevent a gas leak. However, the patent publication discloses neither a sufficient suppression of burning speed with a light silicone coating nor the design of a coated fabric that is a lightweight woven fabric and that has mechanical properties sufficient for ensuring an inflating pressure resistance of the airbag.

Japanese Unexamined Patent Publication (Kokai) No. 5-319194 discloses an attempt to improve the softness of an airbag by a procedure of applying a silicone to the base woven fabric. In the attempt, an airbag base fabric formed of a weaving yarn having a yarn size of from 420 to 840 denier is impregnated with an amino-modified silicone as a softening agent and a methylhydrogensilicone (0.11 to 0.49% by weight) as a water repellent to form an air permeable woven fabric layer. The woven fabric is further coated with a silicone elastomer to form an air impermeable coating layer (35 to 65 g/m²). The patent publication describes that an impact on a human body caused by the deployment of the airbag can be made small, as a result. However, when a base woven fabric formed from a yarn with a yarn size as small as 270 dtex or less and having a lightweight coating of 25 g/m² or less is prepared by the above method in order to aim at a lightweight airbag, the coated base woven fabric cannot pass the FMSS 302 burning test.

Japanese Unexamined Patent Publication (Kokai) No. 11-1876 discloses an embodiment in which the pressure of an airbag is maintained by coating a hollow woven base fabric formed of a weaving yarn having a yarn size of 420 denier with a double-layered silicone elastomer. The patent publication describes as follows. The first layer contains a hydrogensilicone that is a molecular chain extender and a silicone with a high breaking point elongation caused by a reinforcing filler of fumed silica. The second layer contains a silicone having a high tear strength and crosslinked with a vinylsilicone having three or more functional groups. The coating in a coating amount of from 60 to 220 g/m² acts to maintain the pressure. However, the patent publication does not disclose the design of a coated fabric that can maintain the pressure of an airbag while it makes the airbag lightweight.

During the deployment of an airbag, hot particles derived from the burnt residue of a gas-generant in the inflator sometimes form a melt hole, termed a burnt-through-hole, in the bag. When the heat capacity of an airbag fabric that is made from small yarn size synthetic fiber is small, the possibility of forming a melt hole becomes high. Accordingly, means for preventing the bursting of an airbag, that starts from the melt hole, is required. Moreover, ideally, an airbag must deploy immediately at the time of a collision to restrain an occupant. Therefore, an airbag that shows a short deployment time is also required.

BRIEF DESCRIPTION OF THE DRAWINGS

FIG. 1(A) shows an explanatory view for illustrating how to fold an airbag in the method of evaluating the compactness of the airbag.

FIG. 1(B) is an explanatory view for illustrating the state of an intermediately folded airbag.

FIG. 2 is an explanatory view showing a method of measuring the folded thickness of an airbag.

DISCLOSURE OF THE INVENTION

Figure 3:
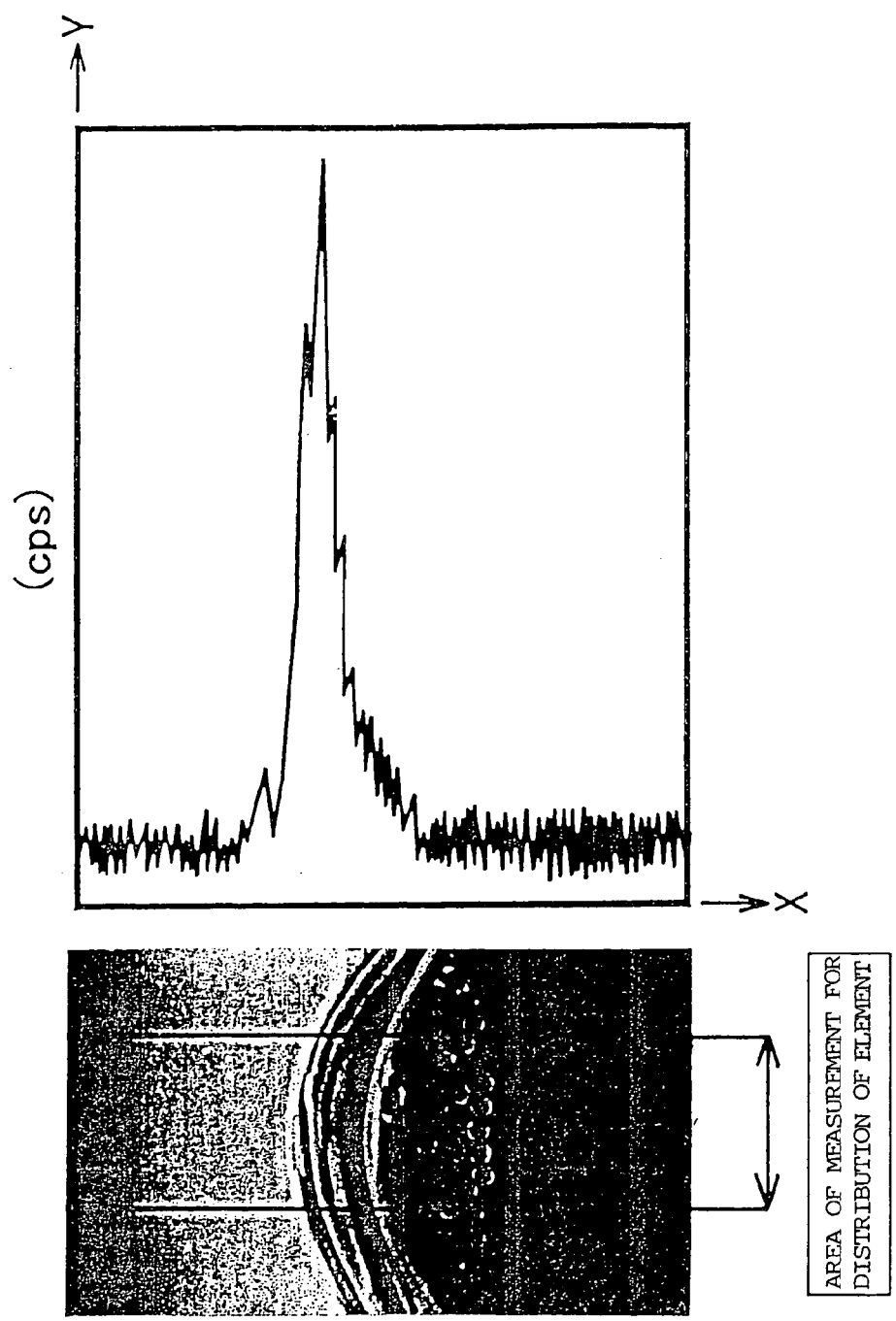
FIG. 3 shows scanning electron microscopic (SEM) photograph of a cross-section showing an overlapped portion of weaving yarns in the silicone coated woven fabric in Comparative Example 74, and a chart exhibiting an XMA (Si) elemental comparative distribution in the cross section. The X-axis (vertical direction) in the chart indicates a direction from the front surface of the woven fabric to the back surface, and the Y-axis (transverse direction) shows a count number of the Si signal.

An object of the present invention is to provide a burning-resistant silicone coated fabric that is excellent in lightness, softness and compactness, and that can pass the FMVSS 302 test.

A more specific object of the present invention is to provide a silicone coated fabric suitable for the production of an airbag that has the mechanical property of resisting an inflating pressure during its deployment, that suppresses bursting caused by a burnt-through-hole during the deployment, that shows excellent restraining properties due to a shortened deployment time, and that hardly injures an occupant.

The present inventors have found that when a silicone coating having a specific coating structure is formed on a soft, dense woven base fabric formed from a weaving yarn having a yarn size of 270 dtex or less, a silicone coated fabric having burning inhibition properties (passing the FMVSS 302 burning test) on excellent level even though the fabric is a lightweight coated one has a small amount of coating, and capable of giving a lightweight airbag that suppresses bursting caused by a burnt-through-hole can be obtained. The silicone coated fabric is a lightweight coated one having a small amount of silicone coating, and ensures air impermeability under high pressure while the coated fabric particularly has the softness of the fabric and improved frictional properties. Accordingly, the present inventors have found that a compact airbag that shortens a deployment time can be manufactured from the silicone coated fabric; they have thus achieved the present invention.

The present invention provides a silicone coated fabric comprising a base woven fabric that is formed from a synthetic fiber weaving yarn having a yarn size of from 100 to 270 dtex, and "a woven yarns size parameter" expressed by a product calculated by multiplying the yarn size of the weaving yarn and the weave density (ends (or picks)/2.54 cm) of from 10,000 to 25,000 (dtex•ends (or picks)/2.54 cm) in both the warp direction and the weft direction, silicone being applied to the woven fabric in an amount of from 5 to 25 g/m$^2$, and showing a maximum burning speed of from 70 to 150 kW/m$^2$ in the radiation burning test using a cone calorimeter.

The silicone coated fabric of the present invention can be produced by a method comprising coating a woven fabric that is formed from a synthetic fiber weaving yarn having a yarn size of from 100 to 270 dtex, and "a woven yarns size parameter" determined by a product calculated by multiplying the yarn size and the weave density (ends (or picks)/2.54 cm) of from 10,000 to 25,000 (dtex·ends (or picks)/2.54 cm) in both the warp direction and the weft direction with silicone in an amount of from 5 to 25 g/m$^2$ by a combination of the two types of applications mentioned in (1) and (2) below, and then crosslinking the silicone coating:

(1) applying to the woven fabric a dope composed of a silicone composition in an amount of from 1 to 21 g/m$^2$ as a solid component; and (2) coating the woven fabric with a liquid silicone composition in an amount of from 4 to 24 g/m$^2$.

The silicone coated fabric of the present invention will be explained below in detail.

<Texture of Base Woven Fabric>

In the bag formation of a lightweight airbag, the mass per unit area of a coated fabric as a bag-forming material is required to be small.

The yarn sizes of a warp and a weft that form the base woven fabric of the coated fabric in the present invention are each from 100 to 270 dtex, preferably from 110 to 250 dtex. The yarn size herein designates a total size of single filaments in a weaving yarn, namely, the warp (or weft) of a weaving yarn that forms the woven fabric (identical to a yarn). The yarn that forms the warp or weft may also be a twisted yarn, a doubled yarn or a collected yarn of a plurality of yarns. That is, the base woven fabric is a woven one prepared by weaving a weaving yarn having a yarn size (in the above sense) of 270 dtex or less.

Furthermore, the base woven fabric in the present invention is formed from a weaving yarn having "a woven yarn size parameter "expressed by a product calculated by multiplying the total yarn size of the weaving yarn and the weave density (ends (or picks)/2.54 cm) of from 10,000 to 25,000 (dtex·ends (or picks)/2.54 cm), preferably from 12,000 to 20,000 (dtex·ends (or picks)/2.54 cm), more preferably from 13,000 to 19,000 (dtex·ends/2.54 cm) in both the warp direction and the weft direction. The woven fabric formed from a weaving yarn with a small yarn size in the above range becomes a lightweight fabric composed of a high density woven fabric.

<Burning Speed of Coated Fabric>

When the coating amount of a silicone for a coated fabric to be prepared is decreased, the decrease in the amount of the silicone to become a burning inhibitor for the synthetic fiber that is a combustible substance increases the burning speed. As the burning speed increases, it is observed that the burning inhibition behavior tends to become unstable.

The silicone coated fabric of the invention has a silicone coating on the base woven fabric in an amount of from 5 to 25 g/m², preferably from 7 to 18 g/m². Moreover, the coated fabric shows a maximum burning speed of from 70 to 150 kW/m², preferably from 100 to 130 kW/m² in a radiation burning test using a cone calorimeter. When the maximum burning speed is lower, the silicone coated fabric can pass a horizontal burning evaluation such as the FMVSS 302 burning evaluation more easily, and the spread of fabric burning is inhibited more even if hot particles derived from an inflator gas generant residue melt the silicone coated fabric. Thus, the following phenomenon never takes place in the airbag for which the coated fabric of the present invention is used: a burnt-through-hole is formed therein, and the hole becomes a starting point and is developed to burst the airbag.

In order to obtain a lightweight airbag for which a base woven fabric formed from a synthetic fiber is used, a base woven fabric formed from a weaving yarn having a small yarn size is used. The heat capacity per unit area of the woven fabric then decreases. Hot particles are usually observed as ashes sticking to the inside of the airbag subsequent to deployment so that the synthetic fiber is melted. As a result, a melt-cut through hole (burnt-through-hole) is sometimes formed. When the metsuke (basis of weight of fabric) of the woven fabric is made smaller, the size of the burnt-through-hole tends to increase. A trace of a burnt-through-hole is sometimes observed in the broken portion of a burst airbag, and the hole is sometimes observed to have become a starting point of the burst. On the other hand, although a silicone does not melt, it burns at high temperature. As a result, a burnt-through-hole is similarly formed in an airbag formed from a conventional lightweight silicone coated fabric, and it sometimes becomes the starting point of burst. The silicone coated fabric according to the present invention suppresses the occurrences of a burnt-through-hole by a silicone coating that imparts a slow radiation burning speed to the fabric.

The cone calorimeter method (ASTM E1354, ISO 5660) is a radiation burning method using a cone heater, and is a method used for evaluating the flame proofness of resin molded articles or the like. In the method, a sample is burnt under predetermined conditions with a radiant heat generated by a cone heater. The method is therefore suitable for evaluating a burning behavior with excellent reproducibility. The burning speed measurement test method with a cone calorimeter will be described later. In the present invention, the bending of a fabric sample caused by thermal deformation is suppressed by placing the sample on a specific screen, and the burning heat generation behavior is measured so that a maximum burning speed is obtained.

The silicone coated fabric of the present invention shows the following properties in the FMVSS 302 burning test: a) the fire goes out within a burning time of 60 sec and with a burning distance 50 mm or less; alternatively, b) the fabric sample burns at a rate of 80 mm/min or less at a burnt distance (the longest distance being 254 mm). The burning evaluation herein is made on 10 or more silicone coated fabric samples (n≧10) in each of the warp, weft and bias directions, and the evaluation is expressed by the maximum value. First, a sample that falls into the category a) shows a burning distance, which is a distance from a measurement-starting point 38 mm apart from an end that catches fire to a point where the fire goes out, of 50 mm or less, and a burning time of 60 sec or less, and is judged to be self-extinguishing. Next, a sample that falls into the category b) is one that does not fall into the category a). The sample shows a burning speed, which is calculated from a burning time consumed until the fire goes out at the burning distance, of 80 mm/min, or a burning speed, which is calculated from a time consumed when the sample burns from the measurement-starting point to a point 254 mm apart therefrom, of 80 mm/min or less. The sample is judged to have slow combustibility.

When the coating amount of the silicone composition of a conventional silicone coated fabric is decreased, the coated fabric has not gained complete acceptance by the FMVSS 302 burning test. That is, an unstable burning inhibition behavior as explained below has been observed. A burning flame becomes large during burning, and cracks are formed on an incinerated coating of the silicone so that burning flames belch out, resulting in flame spreading. As a result, the following problems arise. The burning time and burning distance of test samples increase, and the variation of such value of evaluation increases; samples that deviate from the category of self-extinguishing sometimes appear, or samples that show a burning speed exceeding the required upper limit of 102 mm/min sometimes appear. The coated fabric of the present invention shows a decreased magnitude of a burning flame due to the suppression of the maximum burning speed, so that it is suppressed burning speed in a horizontal burning evaluation due to the stabilization of a burning inhibition effect. As a result, even when the samples are repeatedly evaluated according to the FMVSS 302 burning test, they stably gain the evaluation of self-extinguishing or delayed burning to a high degree.

<Mechanical Properties of Coated Fabric>

An airbag is required to resist a gas pressure during deployment and an internal pressure rises while restraining the occupant. In order for a lightweight airbag to have a pressure resistance at an ordinary driver's seat, the airbag is required to have specific mechanical properties.

The silicone coated fabric of the present invention shows the ratio of a tear strength (single tongue method) to a weaving yarn strength of from 8 to 15, preferably from 9 to 13. The ratio relates to a number of cohering weaving filaments that cohere in the tear-forming region (del) at a tear tip to resist a tear force. That is, the ratio is a tear cohesion ratio. When the tear cohesion ratio is 8 or more, the cohesion process of the filaments mildly absorbs energy in such a portion to which a tearing load is sharply applied during deployment as a bolt hole where the airbag is attached and fixed to a module. As a result, the airbag is not damaged. On the other hand, when the tear cohesion ratio is excessively high, the tensile opening in the seam of the bag increases, and a seam leak burst is produced by the inflator gas. When the tear cohesion ratio is 15 or less, the hot burst of the bag can be suppressed.

The silicone coated fabric of the invention shows a biaxial tensile breaking strength of from 4,000 to 8,000 N/20 cm, preferably from 4,500 to 7,000 N/20 cm. When the breaking strength in a biaxial tensile test is 4,000 N/20 cm or more, the airbag base fabric is never damaged. When the biaxial tensile breaking strength increases more, the inflating pressure resistance also increases further. However, there is a restriction on the biaxial tensile breaking strength of a lightweight airbag due to the yarn size and the weave density.

The biaxial tensile test is a tensile breaking test conducted by holding a coated fabric sample in the warp and weft directions and simultaneously drawing the sample in both directions. When an airbag is deployed to restrain an occupant, the airbag must resist the inflating pressure as a pressure vessel. The stress applied to the coated fabric is generated as a biaxial stress. In contrast to the tension test wherein there is a degree of freedom in the counter axis direction and a contraction factor is present in combination with the tensile factor, the biaxial tensile test represents the actual mechanical properties of the airbag during its deployment.

<Structure of the Silicone Coating>

The silicone coated fabric of the present invention shows a specific silicone distribution in a cross section of the fabric. That is, when a cross section of the silicone coated fabric is observed by SEM, the Si element distribution determined by SEM/XMA has a maximum peak and the other peaks having from 1/20 to 2/3 of the peak count in a central 50% portion where a warp and a weft are overlapped (interlaced) by weaving on the front and back sides. In the present invention, a silicone applied to a base woven fabric is thinly and uniformly distributed among constituent filaments of weaving yarns of the woven fabric, and part of the silicone is segregated and distributed over the woven fabric surface, etc. Moreover, a silicone forms a thin coating layer on one side of the woven fabric surfaces. When the cross section of the silicone coated fabric of the invention is observed by SEM, a cross-sectional structure in which a silicone coating layer is formed on the surface of the woven fabric cross section is observed (refer to FIG. 4 and FIG. 5). Furthermore, the elemental distribution analysis of Si carried out by SEM/XMA gives the following results: a maximum count of Si is obtained in a portion corresponding to the silicone thin coating layer thus formed; a very small amount of Si is distributed among filaments; segregated silicone exists on the woven fabric surface where no silicone coating layer exists, namely, the back side of the coated woven fabric (refer to FIG. 5), etc.

It is in a portion where a warp and a weft are overlapped (interlaced) by weaving on the front and back sides in the cross section of the woven fabric that the distribution structure of the silicone shown by elemental analysis of Si characteristically appears. It is necessary in the present invention that the Si distribution have such a structure in the central portion of overlapped weaving yarns of a warp and a weft of the base woven fabric. Analysis of the Si distribution is carried out by preparing a cross-sectional sample of the coated woven fabric with the cross section including a center where a warp and a weft are overlapped by weaving on the front and back sides, and carrying out elemental analysis of Si by SEM/XMA. Each of the weaving structural repeating units of the weaving yarns is observed, and the distribution analysis is carried out at a site situated in a range along a repeating unit from an overlapped center of the weaving yarns to 50% of the repeating unit length. A Si distribution amount (Y coordinate) is plotted against a distance (X coordinate) in the direction from the front surface (coated surface) to the back surface of the woven fabric. Then, a maximum count peak is observed at a position corresponding to the silicone thin coating layer. Moreover, there is a Si distribution among filaments in a very small amount. Furthermore, a peak of segregated silicone can be observed on the surface of the woven fabric substantially free of the silicone thin coating layer, namely, the back surface of the coating; in some cases, a plurality of segregation peaks including a peak present in the midway between the front and back sides of the woven fabric are observed.

In the present invention, the peak height of the elemental distribution of Si of the segregated silicone is from 1/20 to 2/3, preferably from 1/10 to 1/2 of the maximum peak height thereof in the silicone coating portion. When the peak height ratio is 1/20 or less, contribution of a silicone other than the coating silicone to the inhibition of burning is insignificant, and spreading of the burning of the synthetic weaving yarns cannot be inhibited during the formation of a burnt-through-hole. On the other hand, when the peak ratio is 2/3 or more, a silicone coating with a large weight is formed on both sides of the woven fabric. Alternatively, a nonuniform silicone coating is formed even when the coating is lightweight. As a result, the burning inhibition behavior becomes unstabilized, and the air impermeability under high pressure cannot be ensured.

<Deployment of Airbag and Deployment Friction of the Bag of the Airbag>

Ideally, an airbag should immediately deploy in a crash to restrain an occupant. An airbag is therefore required to complete deployment in a short period of time to be ready for restraining an occupant.

A lightweight airbag has the potential that the deployment time is short because the energy for transferring the center of gravity is small. In order to utilize the advantage, it is first desired to reduce the resistance produced when fabrics forming the bag and being in a compactly folded state spread and expand while rubbing each other at the time of deployment.

The silicone coated fabric of the present invention shows a coefficient of friction (MIU), measured by KES, of from 0.05 to 0.3 in the warp and weft directions on the front and back sides thereof. When the coated fabric is made to have a coefficient of friction (MIU) in the above range, the low coefficient of friction contributes to the high speed deployment of an airbag. Moreover, the present invention can provide an airbag that gives a soft touch to an occupant and that causes no abrasion of the occupant during its deployment.

A measurement by KES (Kawabata's evaluation system for fabric) herein refers to a method of measuring basic dynamic characteristics of a fabric for the purpose of digitizing the feeling, namely, the touch of a fabric that a human body percepts, and is defined in the reference: The Standardization and Analysis of Hand Evaluation, $2^{nd}$ ed., S. Kawabata, the Textile Machinery Society of Japan, July 1980.

There are several measurements by KES that indicate various mechanical properties of a fabric. The measurement by KES for evaluating the frictional properties of a fabric uses a friction probe described in the above reference, and a sample fabric, horizontally held with a predetermined tension on a table, is moved in the warp and weft directions, whereby the coefficient of friction (MIU) can be measured from a tension, i.e, frictional force, imported to the friction probe, which exerts a vertical load on the sample fabric. The surface sliding state of the coated fabrics of the invention can be evaluated by measuring the coefficient of friction by KES. In the present invention, in order to clarify a frictional resistance between two coated fabrics, a coated fabric sample is affixed to the surface of a friction probe defined by KES, and measurements are made. The measurement conditions will be described in detail later.

When the coefficient of friction of a silicone coated fabric is in the above range, damage to the keratin of a human skin is reduced, and the possibility of injuring an occupant with the airbag can be decreased even when the human body is contacted with the airbag during its deployment and spreading or a human body is forced into a deployed airbag.

<High Speed Deployment of Airbag and High Pressure Air Impermeability of the Bag Body>

The silicone coated fabric of the present invention shows an air permeability of 1.0 $cm^3/cm^2$/sec or less, preferably 0.1 $cm^3/cm^2$/sec or less at a pressure of 300 kPa. The deployment gas pressure of an airbag momentarily reaches a large magnitude exceeding 200 kPa. The silicone coated fabric of the present invention maintains air impermeability even under such high pressure. As a result, the fabric can utilize the energy generated by an inflator gas with sufficient effectiveness to deploy the airbag at high speed. During the instantaneous deployment of an airbag with an inflator gas at high pressure, the airbag maintains air impermeability. Even after maintaining a pressure of 50 kPa for 10 sec after the deployment, the airbag holds the pressure well and holds the expanded state. The airbag therefore achieves the effect of protecting an occupant when an automobile rolls over.

<Single Filament Size of a Weaving Yarn Forming the Base Woven Fabric>

The size of a constituent single filament of a weaving yarn that forms the base woven fabric of the silicone coated fabric in the present invention is from 0.5 to 4.5 dtex, preferably from 1.0 to 3.5 dtex. A base woven fabric having a small single filament size has advantages as explained below. First, an airbag having a compact foldability can be obtained because the bending rigidity of the coated fabric is decreased. Second, the single filament size contributes towards shortening the deployment time for the following reasons. Because a coated fabric woven from yarns composed of small sized filaments exhibits small bending hysteresis, the coated fabric is hardly creased. As a result, the airbag in a compactly folded state can be easily expanded and deployed. Third, the use of thin single filaments forms a woven fabric having no intervening pores at the meai portion (intervening portion between neighboring woven yarns) because the single filaments of the weaving yarn cover the meai portions of the front and back side of the fabric. Consequently, a lightweight uniformly coated fabric having a relatively smooth woven fabric surface can be prepared. The coated fabric having smooth and fine recesses and protrusions shows a decreased friction resistance, and contributes toward shortening the deployment time. Fourth, the form of a uniform silicone coating decreases the formation of coating cracks during burning, and burning is inhibited. Fifth, for a woven fabric having no macroscopic recesses and protrusions such as meai pores, a microscopically relatively uniform coating is formed on the surface layer of groups of fine single filaments. As a result, the coating suffers no microscopic destruction when the fabric is deformed under high pressure. The fine single filaments thus contribute toward suppressing gas leakage. Sixth, silicone allowed to penetrate among single filaments having a small size promotes the effect of inhibiting burning to increase the effect of suppressing the spread of burn-through burning.

<Constituent Fiber Material of the Woven Fabric and Weaving the Base Woven Fabric>

There is no specific limitation on the constituent synthetic yarn of a base woven fabric for the silicone coated fabric in the present invention. However, polyhexamethylene adipamide and polytetramethylene adipamide that have a high melting point and a large heat capacity are preferred. Moreover, a yarn mainly containing polyhexamethylene adipamide is also preferably used. Of these yarns, the following yarns having a melting point of 215° C. or more are particularly preferred in view of the heat resistance: a polyhexamethylene adipamide (hereinafter merely referred to as nylon 66) yarn, a nylon 66 copolymer (nylon 66/6, nylon 66/6I, nylon 66/610) yarn, or a nylon 66 yarn obtained by blending nylon-based polymers (nylon 6, nylon 610, etc.). Moreover, these yarns may also contain various additives conventionally used for the purpose of improving the productivity in the production step and spinning step of the yarns and the properties thereof. For example, the yarns may contain thermal stabilizers, antioxidants, light stabilizers, smoothing agents, antistatics, plasticizers, viscosity improver, pigments, flame retardants and the like.

The tensile strength of a yarn forming the silicone coated fabric of the present invention is preferably 5.7 cN/dtex or more, more preferably 6.2 cN/dtex or more, particularly preferably from 6.2 to 11 cN/dtex. A combination of a tensile strength of 5.7 cN/dtex or more with the weave density of the woven fabric can ensure the strength of the coated fabric.

The base woven fabric used for the silicone coated fabric of the invention is satisfactory as long as it is a woven fabric having a texture such as a plain weave, a rip-stop weave and a bascket weave. The fabric can be woven on a conventional loom such as an air-jet loom, a water-jet loom, a lapier loom and a multi-phase weaving machine. There is no specific limitation on the method of weaving the base woven fabric.

<Method of Applying a Silicone Coating>

The silicone coated fabric of the invention is prepared by applying the coating steps (1) and (2) described below to a given base woven fabric to apply a silicone to the base woven fabric in a total coating amount of from 5 to 25 g/m$^2$, and crosslinking the applied silicone.

(1) A coating step of applying a dope composed of a silicone composition in an amount of from 1 to 21 g/m$^2$ as a solid component.

(2) A coating step of coating the woven fabric with a liquid silicone composition in an amount of from 4 to 24 g/m$^2$.

That is, the silicone coating of the invention is formed with two types of coatings applied to the base woven fabric by the separate coating steps. The two coatings have functions different from each other. The coating step (1) is a step of applying a silicone dope having a relatively low viscosity (hereinafter referred to as dope application). On the other hand, the coating step (2) is a step of applying a silicone having a relatively high molecular weight to one side of the base woven fabric to form a coating layer adhering to the base woven fabric surface (hereinafter the step being referred to as thin layer coating).

A dope in the coating step (1) is a diluted solution of a silicone having a low viscosity of preferably from 0.1 to 5 Pa·s (at 25° C., the temperature being the same hereinafter).

The silicone composition used in the dope application principally comprises an addition crosslinking type silicone. For example, the silicone composition preferably comprises (a) an organopolysiloxane having alkenyl groups (including vinyl groups) at the molecular chain ends, (b) an organosiloxane having three or more hydrogen atoms attached to Si atoms, namely, three or more Si—H functional groups, a (c) catalyst that accelerates addition of Si—H functional groups to aliphatic multiple bonds, and (d) an organosilicon compound suitable as an adhesion aid of a silicone to a synthetic fiber polymer.

In particular, the principal agent silicone (a) has a viscosity of preferably from 0.1 to 10 Pa·s. An elastomer obtained by vulcanizing, namely, crosslinking a low viscosity silicone has a small molecular weight between the crosslinkings. As a result, the elastomer has a high crosslinking density. A silicone having a high crosslinking density shows about a half burning speed. The silicone coated fabric therefore burns with a smaller burning flame to exhibits a slow burning speed.

The physical properties of the elastomer formed from the silicone composition can be measured by the following procedure. The liquid silicone composition is vacuum defoamed in the absence of solvent, and the composition is cross linked by hot press molding (170° C.×5 min) to give tensile test pieces (JIS K-6251/dumbbell No. 3). Measurements are made on the test pieces. The physical properties of the elastomer of the silicone composition used in applying a dope are desirably as follows: a tensile strength of from 0.5 to 4 N/mm$^2$ and a tensile breaking elongation of from 20 to 200%.

When the viscosity of the silicone composition having a low viscosity is in the above range, the silicone composition can be used as a dope without dilution. The dope is usually a diluted solution (with organic solvent) of a silicone having a low viscosity or an aqueous emulsion of a silicone having a low viscosity. The aqueous emulsion can be made to have a solid component content of from 1 to 60% by weight.

The coating method can be suitably selected from dip coating, knife coating, fountain coating, roll coating and the like. A method such as dip coating by which the silicone is allowed to penetrate into the base woven fabric texture is preferred. The viscosity of the dope is suitably adjusted to the above range in accordance with a coating method applied.

When a silicone dope is applied by a procedure as explained above, the silicone is distributed over the entire texture of the base woven fabric, and is partially segregated on the surface thereof in the course of removing the water or solvent.

It is important that a low molecular weight silicone adequately penetrate into even single filaments of a yarn of a synthetic fiber forming the base woven fabric and distributed. The dope is preferably applied to the base woven fabric by dip coating or the like so that the dope sufficiently penetrates into the constituent fiber filaments of the woven fabric. When the silicone is applied in such a manner, as explained above, that the silicone is contacted with and distributed to substantially the entire synthetic fiber filaments forming the base woven fabric, the burning speed is suppressed. Moreover, when a silicone is present on the base woven fabric only slightly, damage to the skin is significantly decreased. Accordingly, even the base woven fabric surface to which the dope is applied shows a decreased tendency toward damaging the skin.

The coating amount of the silicone composition used in applying a dope is from 1 to 21 $g/m^2$ as a solid component, preferably from 3 to 15 $g/m^2$. When the coating amount is in the above range, the lightness and flame proofness of the coated fabric subsequent to two types of coating are satisfied.

The coating in the coating step (2) is a step of forming a uniformly thin coating layer which step is applied to one side of a base woven fabric to manifest on the base woven fabric the recessed and protruded shapes of ridges formed by the weaving yarns. The coating layer thus formed forms a firm incinerated film, when the silicone is burnt, to suppress the blowout of a burning gas and inhibit the spread of burning. The coating layer therefore has a function of shortening a burning distance. A coated fabric having only an applied dope shows a relatively large radiation burning speed, whereas a coated fabric with a composite of a dope and a thin coating layer shows a delayed radiation burning speed and a shortened horizontal burning distance. Moreover, the recessed and protruded shapes of the coating reduce the tackiness of a silicone, and improve the friction behavior to shorten the deployment time of the airbag.

The liquid silicone composition applied in the coating step (2) has a viscosity of from 5 to 1,000 Pa·s, preferably from 10 to 500 Pa·s. The liquid silicone composition is desirably applied to the base woven fabric by a non-solvent procedure without diluting with an organic solvent. A liquid silicone having a viscosity in the above range does not penetrate into the texture of the base woven fabric, and is likely to accumulate on the surface. It is important that the coating resin does not penetrate into the texture of the base woven fabric so that the resin is present on the woven fabric surface as much as possible. The silicone coated fabric can thus be modified to pass the FMVSS 302 burning test. That is, when the silicone coating on one side is uniform and the minimum coating thickness is adequately ensured, formation of a coating that brings about the following phenomenon can be avoided, and the burning distance can be stably shortened: the coating layer is broken from a thinner portion of the resin during burning, and a burning gas is blown out.

When the liquid silicone composition has a viscosity of 1,000 Pa·s or less, the resin flows stably during coating, and the coating shows excellent adhesion to the applied silicone dope. The liquid silicone composition used for coating is applied in an amount of from 4 to 24 $g/m^2$, preferably from 5 to 15 $g/m^2$ as a solid component. When the coating amount is in the above range, the silicone coated fabric prepared by applying two types of coatings has satisfactory lightness and flame proofness.

The liquid silicone composition used in the thin coating the woven fabric preferably comprises, for example, (A) an organopolysiloxane having alkenyl groups (including vinyl groups) mainly at molecular ends, (B) an organopolysiloxane having 3 or more hydrogen atoms attached to Si, namely, 3 or more Si—H functional groups in the molecule, (C) a catalyst that accelerates addition of Si—H functional groups to aliphatic multiple bonds, (D) an organosiloxane compound suitable as an adhesion aid for a silicone resin and a synthetic fiber polymer, and (E) a reinforcing filler such as silica. In particular, the principal agent silicone (A) has a viscosity of from 1 to 1,000 Pa·s, preferably from 2 to 100 Pa·s. In order for the silicone coating to have a necessary mechanical strength, the above viscosity, namely molecular weight, is required. Moreover, the toughness of the crosslinked coating is preferably increased with a silica filler, etc. Furthermore, the viscosity of the coating liquid is preferably increased to from 5 to 1,000 Pa·s, more preferably from 10 to 500 Pa·s.

The physical properties of an elastomer of the silicone composition used in thin layer coating the base woven fabric are desirably as follows: a tensile strength of from 2 to 10 $N/mm^2$; and a tensile elongation at break of from 150 to 600%. The tensile properties are obtained by a tensile test of a molded piece explained above.

Contact pressing type coating is used as the coating procedure. Coating procedures such as various commonly used knife coating procedures, roll coating, reverse coating, and the like can be employed. When a coating procedure (gap procedure) in which a gap is provided between a base woven fabric and a coating head is practiced, not only the restriction of the coating amount is difficult but also a coating surface in which recesses and protrusions of ridges of a woven yarn texture are manifested cannot be obtained. Contact pressing conditions in knife coating are as follows: a linear pressure is preferably from 1 to 500 kgf/m, more preferably from 20 to 300 kgf/m. When the linear pressure is higher, a coating in a smaller amount can be obtained. Moreover, a coating surface that conforms contours of the recessed and protruded shape of ridges of woven texture can be obtained. In the present invention, the recesses and protrusions of a woven fabric are made flat at the moment when the coating head such as a knife edge conducts coating, and the coated film is formed with a uniform thickness. Because the recesses and protrusions of the woven fabric surface are recovered when the coating head passes, a coating face that traces the recessed and protruded shape of the woven fabric surface is formed. The linear pressure conditions can be suitably determined in accordance with the viscosity of the dope or the liquid silicone composition, namely, the viscosity of the liquid silicone composition, and the coating head shape. The substantial contact pressure is affected by the contacting area of the coating head on the fabric. For example, a knife having an edge thickness from about 4 mm to about 10 μm should be suitably selected. A knife having a smaller thickness shows a higher substantial contact pressure; therefore, a recessed and protruded shape can be formed by coating the fabric with a smaller amount of a coating composition. The shape of the coating knife may be semicircular, rectangular or recessed at the tip. The radius of the semicircular shape should be from 0.005 to 2 mm. The radius of the rectangular shape should be from 1.0 mm or less. The coating speed is preferably from 1 to 100 m/min, more preferably from 10 to 50 m/min. The coating layer surface that traces the recesses and protrusions of the surface of the base woven fabric does not have the tackiness that a conventional silicone coating surface has, and decreases the friction resistance. The coating surface therefore contributes toward shortening the deployment time of the airbag.

Crosslinking treatment is conducted after each of the silicone applications. Alternatively, crosslinking treatment is carried out collectively after the coatings. Crosslinking treatment may be carried out in accordance with the crosslinking system of the elastomer. For example, when an addition type silicone elastomer is going to be crosslinked by thermally inactivating a catalyst inhibitor for the crosslinking reaction, heat treatment should be conducted at temperatures of from about 150 to 230° C. for about 0.1 to 5 minutes.

A coupling agent that improves adhesion to synthetic fibers is preferably added to any of the silicone compositions used in the present invention. For example, an alkoxysilane having an epoxy group, or the like is preferably added in an amount of from 1 to 15% by weight. Moreover, it is preferred that a crosslinkable silicone having a Si—H bond is excessively added, so that a Si—H/vinyl (alkenyl) functional group ratio is in a range of from 5 to 200. Such an improvement of adhesiveness contributes to the improvement of the tear strength.

Furthermore, known thickeners, flame-resistant agents, stabilizing agents, and the like may be added to any of the above silicone compositions used in the present invention as long as the effects of the present invention are not impaired. During the addition, an insoluble solid additive such as a pigment is added to the silicone composition in an amount of preferably less than 5% by weight, more preferably less than 1% by weight. It is most preferred that pigments and the like are not added.

EMBODIMENTS OF THE INVENTION

The present invention will be concretely explained below by making reference to examples.

In the examples, "parts" designate parts by weight. The methods of evaluating a silicone coated fabric are as follows.

(1) Weave Density

The weave density is measured according to JIS L-1096 8.6.1.

(2) Total Weight of Coating

A sample having an area (A) of about 0.3 m×0.3 m is taken from a silicone coated fabric, weighed accurately, and dried at 105° C. for 2 hours or more. The sample is subsequently degreased with dichloromethane, and dried. The sample is then dissolved in 200 g of formic acid (90%) at room temperature for 3 hours. The insoluble component is separated by filtering with a glass sintered filter (manufactured by Vidrex Co., Ltd., trade name of Glass Filter 17G-3), adequately washed with formic acid, washed with water, and dried at 105° C. for 2 hours. The dried weight (M) of the insoluble component is measured. The total coating weight (g/m$^2$) is obtained by dividing the formic acid-insoluble component (M) by the area (A) of the coated fabric sample.

(3) Maximum Burning Speed with a Cone Calorimeter

A silicone coated fabric is adjusted to be in a standard state according to JIS L 0105, and a rectangular sample, 94×94 mm, is taken therefrom. The sample is placed on the table of measuring equipment with the coated layer side up. A screen of Nichrome wire with 0.25 mmϕ, 100×100 mm, with a 10 mm-mesh is placed on the sample, and set. Using a cone calorimeter (trade name of III-C3, manufactured by Toyo Seiki Seisaku-sho, Ltd.) according to ASTM E 1354, ISO 5660, the sample is heated with a cone heater in air atmosphere. The cone heater is provided so that the radiant calorie becomes 50 kW/m$^2$ at a position 25 mm below the center of the heater. The maximum burning speed is determined from the chart of a burning heat generation speed thus obtained.

(4) Compactness (Thickness of a Folded Airbag)

An airbag 1 (60 liters) for a driver that is prepared by a sewing method based on the description in the specification of WO 99/28164 is folded in the following manner as shown in FIG. 1 (A). An edge a and an edge b are butted against each other on a centerline c-d. The airbag is then folded in a bellows-like manner to form a sequence of a hill-top fold and a valley bottom fold along lines α, β and γ (at equal intervals), whereby an intermediate folded piece 20 is obtained (see FIG. 1(B), e, f and g in the figure being folded peripheral edge lines). An edge c and an edge d of the intermediate folded piece 20 are butted against each other on a centerline a-b, and the folded piece is then folded in a bellows-like manner to form a sequence of a hill-top fold and a valley bottom fold along lines α', β' and γ' to give a folded package 2 (see FIG. 2), 150 mm×150 mm. In FIG. 7, α', β' and γ' designate a hill-top fold and a valley bottom fold in package 2 formed by folding along these lines.

Next, as shown in FIG. 2, the folded airbag 2 is placed on a flat table 4. A glass plate 3, 300 mm×300 mm, is placed on the airbag, and a load is applied to the airbag with a 1 kg weight 5. The average thickness X (mm) is measured 30 minutes after applying the load.

(5) Deployment Test (Observed with a High Speed VTR) and Airbag Burst Evaluation An airbag (60 liters) for a driver's seat described in the specification of WO 99/28164 is prepared by sewing, and an inflator (hybrid type, with a maximum tank pressure of 185 kPa) is attached to the airbag to give a module. A deployment test is conducted at room temperature (n=3).

The deployment state of the airbag is recorded with a high speed VTR. The airbag observed from the front is deployed. When a distance of the periphery from the center reaches 98% or more of the distance of the periphery in the entire peripheral directions from the center achieved 50 msec after starting the deployment, namely, the deployment distance, the deployment is defined to be completed. The time from the start to the completion of deployment is defined as a deployment time.

Furthermore, airbags after deployment are observed, and judged to be burst when even one bag is broken in the deployment test. When airbags are burst, the damaged sites are confirmed. When airbags are not burst, the presence of burnt-through-holes is visually confirmed.

(6) Tensile Strength

The tensile strength of a silicone coated fabric is measured according to JIS L-1096 8.12.1 (A; strip method).

(7) Tear Strength

The tear strength of a silicone coated fabric is measured according to JIS L-1096 6.15.1 (single tongue method).

(8) Biaxial Tensile Test

A silicone coated fabric is adjusted to be in a standard state according to JIS L 0105, and a rectangular sample, 270×270 mm, is taken therefrom. The sample is held so that the warp direction and the weft direction agree with the X direction and the Y direction, respectively, of a tester. Measurements are made on a portion, 200×200 mm, of the sample in the above two directions. A tensile tester (trade name of Biaxial Tensile Tester 2AT-5000, manufactured by Shimazu Corporation) is used, and the test is conducted by simultaneously elongating biaxically at a rate of 200 m/min.

(9) Observation (SEM) of the Cross Section of a Silicone Coated Fabric and Si Elemental Analysis (SEM/XMA)

A silicone coated fabric is sectioned along a weaving yarn so that the resultant cross section includes the center of the yarn to give a cross section where the weaving yarns are most overlapped. The silicone coated fabric is attached to a sample table while the fabric is allowed to stand vertically so that the cross section can be observed from directly thereabove. The sample is directly observed without coating or spattering. The sample is observed with a scanning electron microscope (SEM) (trade name of Scanning Electron Microscope S-3500 N, manufactured by Hitachi Ltd.) at a vacuum degree of 50 Pa and an accelerated voltage of 20 kV.

Elemental analysis of Si is carried out with an X-ray microanalyzer (trade name of EMAX 7000, manufactured by Horiba Limited) attached to the above apparatus; and Si—$K_\alpha$ is observed, and area integration is conducted 20 times. Of a weaving structural repeating unit of the weaving yarns in the silicone coated fabric cross section sample, a region from an overlapped center of the weaving yarns to 50% of the repeating unit length is used as an integration region for observation. Integration is carried out in the direction from the front surface to the back surface of the woven fabric, and a Si distribution amount (count, Y coordinate) is plotted against a distance (X coordinate) in the above direction to give a graph. A maximum peak and to another peak height ratio are determined from the heights of Si peaks.

(10) Coefficient of Friction (MIU)

Coefficient of Friction (MIU) Determined by KES

The coefficient of friction of a sample of a silicone coated fabric 20 cm wide and 20 cm long is measured under standard conditions defined by KES (The Standardization and Analysis of Hand Evaluation, 7. $2^{nd}$ Ed. S. Kawabata, 8. The Textile Machinery Society of Japan, 9. 1980).

A sample fabric is sperially capped on the top the surface of a friction probe defined by KES. Measurements are made by moving the probe on a sample fabric that is horizontally held and the fabric is the same fabric that caps the probe. The sample fabric capped thereon in such a manner that the warp and weft directions of the capped sample agree with the warp and weft directions of the horizontally held sample, respectively each time a measurement is made. Measurements are made at five sites within the sample, and the average value is obtained.

(11) Burning Speed according to FMVSS302

Measurements are made according to FMVSS302 (horizontal method).

(12) Air Permeability

The air permeability is measured according to JIS L-1096 8.27 A (Frazier method).

(13) Air Permeability at High Pressure

A high pressure type apparatus is prepared, and measurements are made according to JIS L-1096 8.27 (Frazier method). Using a flange having a pressurizing effective diameter of 52 mm, a silicone coated fabric sample is attached to the measuring portion with bolts with the silicone coating side down. Air compressed at a pressure of 300 kPa is introduced at a stretch from a pressure chamber arranged below the sample through a pressure-regulating valve. Air that passes through the sample is collected in a collecting chamber arranged above the sample, and the permeated amount of air is measured with a rotor meter. A pressure of 300 kPa is applied for 10 sec; the pressure of the pressure chamber is then regulated to 50 kPa, and the chamber is closed. The holding ratio is obtained by measuring a holding pressure 10 sec after closing.

(14) Damage to Keratin

Measurements are made according to Japanese Unexamined Patent Publication (Kokai) No. 11-344488. Using the skin friction apparatus described in the patent publication, a silicone coated fabric sample having a friction area of 10 mm in diameter is affixed, and a panelist is subjected to a test in which rubbing at a rate of 60 rpm is conducted 500 times under a load of 200 g. A change in moisture of the keratin of skin is evaluated from an electric resistance ($\mu$S) with a measuring apparatus described in the same patent publication.

EXAMPLES 11 TO 13 AND COMPARATIVE EXAMPLES 11 TO 12

Nylon 66 described in Japanese Patent Application No. 2001-050177 was melt spun with an extruder type spinning machine. A spin finish oil was applied to the spun filaments, and the filaments were hot drawn to give nylon yarns each having a predetermined yarn size. The yarns showed a tensile strength of 8.5 cN/dtex and an elongation of 21%, and contained the applied spin finish oil in an amount of 1.0% by weight.

The spin finish oil was a hydrocarbon solution containing 30% by weight of a mixture composed of 40 parts of dialkyl thiodipropionate, 30 parts of PO/EO alkylpolyether and 30 parts of POE hardened castor oil trialkylester, and was fed by means of an oiling nozzle.

When the yarn was to be warped, S1700 (trade name, manufactured by Goo Chemical Co., Ltd.) was applied to the yarn as a warping oil in an amount of 1.0% by weight using a kiss-roll system so that the warped yarn had 2.0% by weight of the applied oil in a total amount. Warp preparation such as beaming was conducted, and the yarns were woven on an air-jet loom (AJL) to give a woven fabric.

The woven fabric was neither scoured nor heat set.

Next, the woven fabrics were coated with an aqueous silicone composition dope in an amount of 3 g/m² as a solid component using a dip coater, and heat treated for 2 minutes within a drying machine (180/200° C.). The silicone composition dope herein was prepared by stirring a mixture of 23.5 parts of an aqueous emulsion of silicone (trade name of Dehesive 38197 VP, manufactured by Wacker-Chemie GmbH, Germany), 3 parts of an organopolysiloxane having at least 3 hydrogen atoms attached to Si (trade name of Cross Linker V20, manufactured by Wacker-Chemie GmbH, Germany), 1.5 parts of an organosilicon compound (trade name of Adhesion Promotor HF 86, manufactured by Wacker-Chemie GmbH, Germany) as a suitable adhesive aid and 74.0 parts of water.

Using a floating knife coater, the resultant woven fabrics were coated with a liquid silicone composition in an amount of 10 g/m² as a solid component, and heat treated for 1 minute within a drying machine (180/200° C.) to give coated fabrics. The liquid silicone composition used herein was a mixture of 98 parts of an addition crosslinking type silicone composition (trade name of Elastosil LR6200AB (manufactured by Wacker-Chemie GmbH, Germany) containing a crosslinking agent and an addition reaction catalyst, 3 parts of a generally used addition type crosslinking agent (trade name of Cross Linker W, manufactured by Wacker-Chemie GmbH, Germany) that was intended to further add an organopolysiloxane having at least 3 hydrogen atoms attached to Si and 3 parts of an organosilicon compound (trade name of Adhesion Promotor HF 86, manufactured by Wacker-Chemie GmbH, Germany) suitable as an adhesive aid. The edge of the coating knife had a thickness of 0.1 mm. The coating amount was adjusted by applying a tension of from 10 to 100 kgf/m to the woven fabrics.

Table 1 shows samples having various yarn sizes and weaving textures, and the results obtained from airbags prepared from the coated fabrics thus obtained.

TABLE 1

| | Ex. 11 | | Ex. 12 | | Ex. 13 | | Comp. Ex. 11 | | Comp. Ex. 12 | |
|---|---|---|---|---|---|---|---|---|---|---|
| | warp | weft | warp | weft | warp | weft | warp | weft | warp | weft |
| Weaving yarn size (dtex) | 115 | 115 | 155 | 155 | 235 | 235 | 78 | 78 | 350 | 350 |
| Single filament size (dtex) | 3.2 | 3.2 | 3.2 | 3.2 | 2.9 | 2.9 | 3.3 | 3.3 | 5.9 | 5.9 |
| Weave density (ends or picks/2.54 cm) | 107 | 107 | 91 | 91 | 75 | 75 | 140 | 140 | 60 | 60 |
| Woven yarn size parameter (ends ≅ dtex (or picks)/2.54 cm) | 12305 | 12305 | 14105 | 14105 | 17625 | 17625 | 10920 | 10920 | 21000 | 21000 |
| METSUKE, basis of weight of fabric (g/m$^2$) | 107 | | 121 | | 147 | | 97 | | 173 | |
| Total amt. of coating (g/m$^2$) (applied dope + thin layer coating) | 13 3 + 10 | | 13 3 + 10 | | 13 3 + 10 | | 13 3 + 10 | | 13 3 + 10 | |
| Max. radiation burning speed (kW/m$^2$) | 81 | | 101 | | 124 | | 63 | | 138 | |
| Evaluation of bag burst | No burst | | No burst | | No burst | | Burst | | No burst | |
| Observation of bag damage | No problem | | No problem | | No problem | | Break of base fabric | | No problem | |
| Observation of burnt-through-hole | Not observed | | Not observed | | Not observed | | — | | Not observed | |
| Deployment time (msec) | 27 | | 28 | | 32 | | — | | 37 | |
| Foldability (mm) | 21 | | 22 | | 27 | | 20 | | 29 | |

In Comparative Example 11, the yarn size of the woven fabric was too small. Consequently, the coated fabric could not resist the airbag deployment, and resulted in a break of the coated fabric itself, namely, a break of the base fabric. In Comparative Example 12, the yarn size of the woven fabric was too large. Consequently, the desired compact airbag could not be obtained therefrom, and the deployment time was long. In Examples 11 to 23, the airbags thus obtained were compact, caused no problem about the deployment, produced no burnt-through-hole, and showed a short deployment time.

EXAMPLES 21 TO 27 AND COMPARATIVE EXAMPLES 31 TO 38

A silicone coated fabric was prepared in the same manner as Example 11. Tables 2 to 3 show the results of evaluating the tensile strength and tear strength.

TABLE 2

| | Ex. 21 | | Ex. 22 | | Ex. 23 | | Ex. 24 | |
|---|---|---|---|---|---|---|---|---|
| | warp | weft | warp | weft | warp | weft | warp | weft |
| Weaving yarn size (dtex) | 115 | 115 | 155 | 155 | 155 | 155 | 235 | 235 |
| Single filament size (dtex/filament) | 3.2 | 3.2 | 3.2 | 3.2 | 3.2 | 3.2 | 3.2 | 3.2 |
| METSUKE, basis of weight of fabric (g/m$^2$) | 107 | | 106 | | 121 | | 117 | |
| Total amount of coating (g/m$^2$) (Applied dope + thin layer coating) | 13 (3 + 10) | | 13 (3 + 10) | | 13 (3 + 10) | | 13 (3 + 10) | |
| Max. radiation burning speed (kW/m$^2$) | 81 | | 89 | | 101 | | 132 | |
| Yarn strength (cN/dtex) | 8.5 | 8.5 | 8.5 | 8.5 | 8.5 | 8.5 | 8.5 | 8.5 |
| Silicone composition additive — Applied dope | HF-3 Parts | | HF:3 parts | | HF-3 parts | | No addition | |
| Silicone composition additive — Thin layer coating | HF-3 parts:W-3 parts | | HF-3 parts:W-3 parts | | HF-3 parts:W-3 parts | | No addition | |
| Weave density (ends or picks/2.54 cm) | 107 | 107 | 78 | 78 | 91 | 91 | 58 | 58 |
| Woven yarn size parameter (ends ≅ dtex (or picks)/2.54 cm) | 12305 | 12305 | 12090 | 12090 | 14105 | 14105 | 13630 | 13630 |
| Woven fabric strength (N/5 cm) | 1935 | 1950 | 1860 | 1890 | 2150 | 2170 | 2670 | 2710 |
| Weaving yarn strength (N) | 9.2 | 9.3 | 12.1 | 12.3 | 12.0 | 12.1 | 23.4 | 23.7 |
| Single tongue tear strength | 82 | 88 | 136 | 145 | 131 | 139 | 188 | 193 |
| Single tongue tear strength/woven yarn strength | 8.9 | 9.5 | 11.2 | 11.8 | 10.9 | 11.5 | 8.0 | 8.1 |

TABLE 2-continued

| | | | | | | | |
|---|---|---|---|---|---|---|---|
| Evaluation of bag burst | No burst | | No burst | | No burst | | No burst |
| Observation of bag damage | No problem | | No problem | | No problem | | No problem |
| Observation of burnt-through-hole | Not observed | | Not observed | | Not observed | | Not observed |
| Deployment time (msec) | 27 | | 28 | | 28 | | 32 |
| Folding height (mm) | 21 | | 21 | | 22 | | 27 |

| | Ex. 25 | | Ex. 26 | | Ex. 27 | |
|---|---|---|---|---|---|---|
| | warp | weft | warp | weft | warp | weft |
| Weaving yarn size (dtex) | 235 | 235 | 235 | 235 | 235 | 235 |
| Single filament size (dtex/filament) | 3.2 | 3.2 | 3.2 | 3.2 | 2.9 | 2.9 |
| METSUKE, basis of weight of fabric (g/m$^2$) | 147 | | 128 | | 147 | |
| Total amount of coating (g/m$^2$) (Applied dope + thin layer coating) | 13 (3 + 10) | | 13 (3 + 10) | | 13 (3 + 10) | |
| Max. radiation burning speed (kW/m$^2$) | 132 | | 102 | | 124 | |
| Yarn strength (cN/dtex) | 8.5 | 8.5 | 8.5 | 8.5 | 8.5 | 8.5 |
| Silicone composition additive | Applied dope | HF-3 parts | | HF-3 parts | | HF-3 parts | |
| | Thin layer coating | W-3 parts | | HF-3; W-3 parts | | HF-3; W-3 parts | |
| Weave density (ends or picks/2.54 cm) | 75 | 75 | 64 | 64 | 75 | 75 |
| Woven yarn size parameter (ends ≅ dtex (or picks)/2.54 cm) | 17625 | 17625 | 15040 | 15040 | 17625 | 17625 |
| Woven fabric strength (N/5 cm) | 2670 | 2710 | 2310 | 2330 | 2680 | 2690 |
| Weaving yarn strength (N) | 18.1 | 18.4 | 18.3 | 18.5 | 18.2 | 18.2 |
| Single tongue tear strength | 165 | 172 | 202 | 208 | 183 | 187 |
| Single tongue tear strength/woven yarn strength | 9.1 | 9.4 | 11.0 | 11.2 | 10.1 | 10.3 |
| Evaluation of bag burst | No burst | | No burst | | No burst | |
| Observation of bag damage | No problem | | No problem | | No problem | |
| Observation of burnt-through-hole | Not observed | | Not observed | | Not observed | |
| Deployment time (msec) | 32 | | 32 | | 32 | |
| Folding height (mm) | 27 | | 23 | | 27 | |

TABLE 3

| | Comp. Ex. 31 | | Comp. Ex. 32 | | Comp. Ex. 33 | | Comp. Ex. 34 | |
|---|---|---|---|---|---|---|---|---|
| | warp | weft | warp | weft | warp | weft | warp | weft |
| Weaving yarn size (dtex) | 78 | 78 | 155 | 155 | 155 | 155 | 155 | 155 |
| Single filament size (dtex/filament) | 3.2 | 3.2 | 3.2 | 3.2 | 3.2 | 3.2 | 3.2 | 3.2 |
| METSUKE, basis of weight of fabric (g/m$^2$) | 97 | | 85 | | 121 | | 85 | |
| Total amount of coating (g/m$^2$) (Applied dope + thin layer coating) | 13 (3 + 10) | | 0 (0 + 0) | | 0 (0 + 0) | | 13 (3 + 10) | |
| Max. radiation burning speed (kW/m$^2$) | 63 | | 108 | | 153 | | 68 | |
| Yarn strength (cN/dtex) | 8.5 | 8.5 | 8.5 | 8.5 | 8.5 | 8.5 | 8.5 | 8.5 |
| Silicone composition additive | Applied dope | HF-3 parts | | No additives | | No additives | | HF-3 parts | |
| | Thin layer coating | HF-3; W-3 parts | | No additives | | No additives | | HF-3; W-3 parts | |
| Weave density (ends or picks/2.54 cm) | 140 | 140 | 60 | 60 | 91 | 91 | 60 | 60 |
| Woven yarn size parameter (ends ≅ dtex (or picks)/2.54 cm) | 10920 | 10920 | 9300 | 9300 | 14105 | 14105 | 9300 | 9300 |
| Woven fabric strength (N/5 cm) | 1718 | 1725 | 1440 | 1460 | 2180 | 2230 | 1430 | 1440 |
| Weaving yarn strength (N) | 6.2 | 6.3 | 12.2 | 12.4 | 12.2 | 12.4 | 12.1 | 12.2 |
| Single tongue tear strength | 82 | 88 | 83 | 91 | 59 | 64 | 142 | 149 |
| Single tongue tear strength/woven yarn strength | 13.2 | 14.1 | 6.8 | 7.4 | 4.8 | 5.1 | 11.7 | 12.2 |
| Evaluation of bag burst | Burst | | Burst | | Burst | | Burst | |
| Observation of bag damage | Break of base fabric | | Break of base fabric | | Break caused by burning through | | Break of base fabric | |

TABLE 3-continued

|  | Comp. Ex. 35 | | Comp. Ex. 36 | | Comp Ex. 37 | | Comp Ex. 38 | |
| --- | --- | --- | --- | --- | --- | --- | --- | --- |
| (previous columns) | warp | weft | warp | weft | warp | weft | warp | weft |
| Observation of burnt-through-hole | — | | — | | — | | — | |
| Deployment time (msec) | — | | — | | — | | — | |
| Folding height (mm) | 20 | | 19 | | 22 | | 19 | |
| Weaving yarn size (dtex) | 235 | 235 | 235 | 235 | 235 | 235 | 470 | 470 |
| Single filament size (dtex/filament) | 3.2 | 3.2 | 3.2 | 3.2 | 3.2 | 3.2 | 6.7 | 6.7 |
| METSUKE, basis of weight of fabric (g/m$^2$) | 87 | | 147 | | 87 | | 174 | |
| Total amount of coating (g/m$^2$) (Applied dope + thin layer coating) | 0 (0 + 0) | | 0 (0 + 0) | | 0 (0 + 0) | | 0 (0 + 0) | |
| Max. radiation burning speed (kW/m$^2$) | 117 | | 212 | | 63 | | 173 | |
| Yarn strength (cN/dtex) | 8.5 | 8.5 | 8.5 | 8.5 | 8.5 | 8.5 | 8.5 | 8.5 |
| Silicone composition additive — Applied dope | No additives | | No additives | | HF-3 parts | | HF-3 parts | |
| Silicone composition additive — Thin layer coating | No additives | | No additives | | HF-3; W-3 parts | | HF-3; W-3 parts | |
| Weave density (ends or picks/2.54 cm) | 41 | 41 | 75 | 75 | 41 | 41 | 45 | 46 |
| Woven yarn size parameter (ends ≅ dtex (or picks)/2.54 cm) | 9635 | 9635 | 17625 | 17625 | 9635 | 9635 | 21150 | 21120 |
| Woven fabric strength (N/5 cm) | 1440 | 1450 | 2180 | 2190 | 1480 | 1510 | 3120 | 3080 |
| Weaving yarn strength (N) | 17.8 | 18.0 | 14.8 | 14.8 | 18.3 | 18.7 | 35.2 | 34.0 |
| Single tongue tear strength | 176 | 185 | 93 | 98 | 314 | 321 | 210 | 226 |
| Single tongue tear strength/woven yarn strength | 9.9 | 10.3 | 6.3 | 5.6 | 17.1 | 17.2 | 6.0 | 6.6 |
| Evaluation of bag burst | Burst | | No burst | | Burst | | Burst | |
| Observation of bag damage | Break of base fabric | | Break at bolt portion | | Opening of seam in sewed portion | | No problem | |
| Observation of burnt-through-hole | — | | Observed | | — | | Not observed | |
| Deployment time (msec) | — | | 35 | | — | | — | |
| Folding height (mm) | 20 | | 27 | | 20 | | 32 | |

Furthermore, as shown in Tables 2 and 3, experiments were conducted in the following manner. Silicone compositions for dopes to be applied were prepared by adding or without adding an organosilicon compound (trade name of Adhesion Promotor HF86, manufactured by Wacker-Chemie GmbH, Germany) suitable as an adhesive aid. Moreover, silicone compositions for coatings were prepared by adding or without adding an organopolysiloxane (trade name of Cross Linker W, manufactured by Wacker-Chemie GmbH, Germany) that has at least 3 hydrogen atoms attached to Si, and by adding or without adding an organosilicon compound (trade name of Adhesion Promotor HF86, manufactured by Wacker-Chemie GmbH, Germany) suitable as an adhesive aid.

The airbags in Comparative Examples 31, 32, 34 and 35 were burst due to the breaking of the base fabrics due to a small yarn size or a small weave density. The airbag in Comparative Example 33 was burst, and the burst was observed to be accompanied by a burnt-through-hole. The airbag in Comparative Example 36 was not burst. However, a break took place in a portion where a bolt had been attached thereto, and the airbag appeared to have been torn off the bolt hole. Accordingly, the safety of the airbag cannot be maintained. These airbags were burst or broken for the following reasons. The adhesive aid was not added, and the organopolysiloxane that contained at least 3 hydrogen atoms attached to Si and that is in general an addition type crosslinking agent was not additionally added to the coating. Accordingly, the silicone coated fabric showed a low tear cohesion ratio, and could not hold a sudden impact of a tear stress. In Comparative Example 37, the adhesive aid and the crosslinking agent were additionally added to the silicone compositions, and the weave density was low. As a result, the tear cohesion ratio became too high, and the state of the burst was as follows: a hot gas leaked from the sewed portion, and a portion having been melted was observed in the seam portion. Because the yarn size of the weaving yarn was large in Comparative Example 38, the airbag was not compact, and had a long deployment time.

In Examples 21 to 23, 26 and 27, the adhesion aid and the crosslinking agent were additionally added to the silicone compositions. The silicone coated fabrics showed a tear cohesion ratio in an excellent region, and the airbags were deployed without a problem. Although the silicone composition for the coating in Example 25 contained no adhesive aid, no problem arose. Although neither the adhesive aid nor the crosslinking agent was additionally added to the silicone composition in Example 24, the silicone coated fabric showed a relatively low weave density and an excellent tear cohesion ratio, and the deployment of the airbag caused no problem.

EXAMPLES 41 TO 43 AND COMPARATIVE EXAMPLES 41 TO 43

Silicone coated fabrics were prepared in the same manner as in Example 11, and evaluated. The yarn size and weaving texture were altered, and biaxial tensile tests were carried out. Table 4 shows the results thus obtained.

TABLE 4

| | Ex. 41 | | Ex. 42 | | Ex. 43 | | Ex. 44 | |
|---|---|---|---|---|---|---|---|---|
| | warp | weft | warp | weft | warp | weft | warp | Weft |
| Weaving yarn size (dtex) | 115 | 115 | 155 | 155 | 235 | 235 | 235 | 235 |
| Single filament size (dtex) | 3.2 | 3.2 | 3.2 | 3.2 | 2.9 | 2.9 | 2.9 | 2.9 |
| Yarn strength (cN/dtex) | 8.5 | 8.5 | 8.5 | 8.5 | 8.5 | 8.5 | 7.0 | 7.0 |
| Weave density (ends or picks/2.54 cm) | 107 | 107 | 91 | 91 | 75 | 75 | 75 | 75 |
| Woven yarn size parameter (dtex ≅ ends (or picks)/2.54 cm) | 12305 | 12305 | 14105 | 14105 | 17625 | 17625 | 17625 | 17625 |
| Biaxial elongation strength of Woven fabric (N/20 cm) | 3830 | 4020 | 4790 | 4880 | 6740 | 6820 | 5630 | 5650 |
| METSUKE, basis of weight of fabric (g/m²) | 107 | | 121 | | 147 | | 147 | |
| Total amount of coating (g/m²) (Applied dope + thin layer coating) | 13 (3 + 10) | | 13 (3 + 10) | | 13 (3 + 10) | | 13 (3 + 10) | |
| Max. radiation burning speed (kW/m²) | 81 | | 101 | | 124 | | 123 | |
| Silicone composition additive   Applied dope   Thin layer coating | HF-3 parts HF 3:W 3 | | HF-3 parts HF 3:W 3 | | HF-3 parts HF 3:W 3 | | HF-3 parts HF 3:W 3 | |
| Evaluation of bag burst | No burst | | No burst | | No burst | | No burst | |
| Observation of bag damage | No problem | | No problem | | No problem | | No problem | |
| Observation of burnt-through-hole | Not observed | | Not observed | | Not observed | | Not observed | |
| Deployment time (msec) | 27 | | 28 | | 32 | | 32 | |
| Folding height (mm) | 21 | | 22 | | 27 | | 27 | |

| | Comp. Ex. 41 | | Comp Ex. 42 | | Comp. Ex. 43 | |
|---|---|---|---|---|---|---|
| | warp | weft | warp | weft | warp | Weft |
| Weaving yarn size (dtex) | 78 | 78 | 470 | 470 | 940 | 940 |
| Single filament size (dtex) | 3.2 | 3.2 | 6.7 | 6.7 | 6.7 | 6.7 |
| Yarn strength (cN/dtex) | 8.5 | 8.5 | 8.5 | 8.5 | 8.5 | 8.5 |
| Weave density (ends or picks/2.54 cm) | 140 | 140 | 46 | 46 | 32 | 32 |
| Woven yarn size parameter (dtex ≅ ends (or picks)/2.54 cm) | 10920 | 10920 | 21620 | 21620 | 30080 | 30080 |
| Biaxial elongation strength of Woven fabric (N/20 cm) | 2890 | 3180 | 8850 | 9210 | 13090 | 14090 |
| METSUKE, basis of weight of fabric (g/m²) | 97 | | 177 | | 300 | |
| Total amount of coating (g/m²) (Applied dope + thin layer coating) | 13 (3 + 10) | | 13 (3 + 10) | | 13 (3 + 10) | |
| Max. radiation burning speed (kW/m²) | 63 | | 173 | | 298 | |
| Silicone composition additive   Applied dope   Thin layer coating | HF-3 parts HF 3:W 3 | | HF-3 parts HF 3:W 3 | | HF-3 parts HF 3:W 3 | |
| Evaluation of bag burst | Burst | | No burst | | No burst | |
| Observation of bag damage | Seam opened | | No problem | | No problem | |
| Observation of burnt-through-hole | — | | Not observed | | Not observed | |
| Deployment time (msec) | — | | 37 | | 39 | |
| Folding height (mm) | 20 | | 32 | | 45 | |

The base fabric in Comparative Example 41 showed an insufficient biaxial elongation strength because the base fabric itself was broken due to insufficient pressure the resistance. Although the silicone coated fabrics in Comparative Examples 42 and 43 showed a very high biaxial elongation strength, and the airbags caused no problem, the desired compact airbags were not obtained, and the deployment time was long.

The silicone coated fabrics in Examples 41 to 43 showed a sufficient biaxial elongation strength, and the deployment of airbags caused no problem. Example 43 is an example wherein the hot drawing ratio was decreased during the preparation of a nylon 66 yarn, and as a result the weaving yarn strength was low. However, the silicone coated fabric showed a sufficient biaxial elongation strength, and the deployment of the airbag caused no problem.

EXAMPLES 51 TO 57 AND COMPARATIVE EXAMPLES 51 TO 56

A silicone coated fabric was prepared in the same manner as in Example 1 except for the following procedure, and evaluated: a nylon 66 woven fabric was prepared on a water-jet loom; an acrylate sizing agent was used in place of a warping finish oil during warping; and alkali scouring, water washing, drying and heat setting at 70° C. were conducted to give a gray fabric for a silicone coated fabric. Table 5 shows the results thus obtained by changing a yarn size, a weaving texture and a coating amount.

TABLE 5

|  | Ex. 51 | | Ex. 52 | | Ex. 53 | | Ex. 54 | |
| --- | --- | --- | --- | --- | --- | --- | --- | --- |
|  | warp | weft | Warp | weft | warp | weft | warp | Weft |
| Weaving yarn size (dtex) | 110 | 110 | 155 | 155 | 155 | 155 | 155 | 155 |
| Single filament size (dtex) | 3.2 | 3.2 | 2.9 | 2.9 | 2.9 | 2.9 | 2.9 | 2.9 |
| Weave density (ends or picks/2.54 cm) | 107 | 107 | 91 | 91 | 91 | 91 | 91 | 91 |
| Woven yarn size parameter (dtex ≅ ends (or picks)/2.54 cm) | 11770 | 11770 | 14105 | 14105 | 14105 | 14105 | 14105 | 14105 |
| METSUKE, basis of weight of fabric (g/m$^2$) | 103 | | 121 | | 121 | | 121 | |
| Total amount of coating (g/m$^2$) | 10 | | 5 | | 13 | | 21 | |
| (Applied dope + thin layer coating) | (3 + 7) | | (1 + 4) | | (3 + 10) | | (3 + 18) | |
| Max. radiation burning speed (kW/m$^2$) | 88 | | 129 | | 101 | | 93 | |
| CF* (MIU) of uncoated surface | 0.10 | 0.17 | 0.13 | 0.19 | 0.12 | 0.18 | 0.12 | 0.18 |
| CF* (MIU) of coated surface | 0.11 | 0.15 | 0.12 | 0.13 | 0.12 | 0.12 | 0.13 | 0.21 |
| Evaluation of bag burst | No burst | | No burst | | No burst | | No burst | |
| Observation of bag damage | No problem | | No problem | | No problem | | No problem | |
| Observation of burnt-through-hole | Not observed | | Not observed | | Not observed | | Not observed | |
| Deployment time (msec) | 27 | | 29 | | 28 | | 29 | |
| Folding height (mm) | 21 | | 22 | | 22 | | 22 | |

|  | Ex. 55 | | Ex. 56 | | Ex. 57 | |
| --- | --- | --- | --- | --- | --- | --- |
|  | warp | weft | warp | weft | warp | weft |
| Weaving yarn size (dtex) | 155 | 155 | 235 | 235 | 235 | 235 |
| Single filament size (dtex) | 2.9 | 2.9 | 2.9 | 2.9 | 2.9 | 2.9 |
| Weave density (ends or picks/2.54 cm) | 91 | 91 | 75 | 75 | 75 | 75 |
| Woven yarn size parameter (dtex ≅ ends (or picks)/2.54 cm) | 14105 | 14105 | 17625 | 17625 | 17625 | 17625 |
| METSUKE, basis of weight of fabric (g/m$^2$) | 121 | | 147 | | 147 | |
| Total amount of coating (g/m$^2$) (Applied dope + thin layer coating) | 25 (3 + 23) | | 10 (3 + 7) | | 25 (3 + 23) | |
| Max. radiation burning speed (kW/m$^2$) | 86 | | 124 | | 107 | |
| CF* (MIU) of uncoated surface | 0.12 | 0.18 | 0.13 | 0.17 | 0.13 | 0.17 |
| CF* (MIU) of coated surface | 0.15 | 0.25 | 0.12 | 0.20 | 0.18 | 0.28 |
| Evaluation of bag burst | No burst | | No burst | | No burst | |
| Observation of bag damage | No problem | | No problem | | No problem | |
| Observation of burnt-through-hole | Not observed | | Not observed | | Not observed | |
| Deployment time (msec) | 30 | | 31 | | 33 | |
| Folding height (mm) | 23 | | 23 | | 23 | |

Note:
CF* = Coefficient of friction

TABLE 5-2

|  | Comp. Ex. 51 | | Comp. Ex. 52 | | Comp. Ex. 53 | | Comp. Ex. 54 | |
| --- | --- | --- | --- | --- | --- | --- | --- | --- |
|  | warp | weft | warp | weft | warp | weft | warp | Weft |
| Weaving yarn size (dtex) | 78 | 78 | 155 | 155 | 235 | 235 | 350 | 350 |
| Single filament size (dtex/filament) | 3.3 | 3.3 | 2.9 | 2.9 | 2.9 | 2.9 | 5.9 | 5.9 |
| Weave density (ends or picks/2.54 cm) | 140 | 140 | 91 | 91 | 75 | 75 | 60 | 60 |
| Woven yarn size parameter (dtex ends (or picks)/2.54 cm) | 10920 | 10920 | 14105 | 14105 | 17625 | 17625 | 21000 | 21000 |
| METSUKE, basis of weight of fabric (g/m$^2$) | 97 | | 121 | | 147 | | 173 | |
| Total amount of coating (g/m$^2$) | 30 | | 30 | | 30 | | 10 | |
| (Applied dope + thin layer coating) | (3 + 27) | | (30 + 27) | | (30 + 27) | | (3 + 7) | |
| Max. radiation burning speed (kW/m$^2$) | 49 | | 82 | | 101 | | 178 | |
| CF* (MIU) of uncoated surface | 0.10 | 0.17 | 0.12 | 0.18 | 0.13 | 0.17 | 0.17 | 0.20 |
| CF* (MIU) of coated surface | 0.39 | 0.45 | 0.32 | 0.40 | 0.31 | 0.39 | 0.10 | 0.20 |
| Evaluation of bag burst | burst | | No burst | | No burst | | No burst | |
| Observation of bag damage | Break of base fabric | | No problem | | No problem | | No problem | |
| Observation of burnt-through-hole | — | | Not observed | | Not observed | | Not observed | |
| Deployment time (msec) | — | | 34 | | 36 | | 37 | |
| Folding height (mm) | 19 | | 23 | | 23 | | 29 | |

TABLE 5-2-continued

|  | Comp. Ex. 55 | | Comp. Ex. 56 | |
| --- | --- | --- | --- | --- |
|  | warp | weft | warp | weft |
| Weaving yarn size (dtex) | 350 | 350 | 155 | 155 |
| Single filament size (dtex/filament) | 5.9 | 5.9 | 2.9 | 2.9 |
| Weave density (ends or picks/2.54 cm) | 60 | 60 | 91 | 91 |
| Woven yarn size parameter (dtex ends (or picks)/2.54 cm) | 21000 | 21000 | 14105 | 14105 |
| METSUKE, basis of weight of fabric (g/m$^2$) | 173 | | 121 | |
| Total amount of coating (g/m$^2$) (Applied dope + thin layer coating) | 30 (3 + 27) | | 0 (3 + 0) | |
| Max. radiation burning speed (kW/m$^2$) | 11 | | 153 | |
| CF* (MIU) of uncoated surface | 0.17 | 0.20 | 0.17 | 0.25 |
| CF* (MIU) of coated surface | 0.40 | 0.43 | — | — |
| Evaluation of bag burst | No burst | | Burst | |
| Observation of bag damage | No problem | | Burn-through break | |
| Observation of burnt-through-hole | Not observed | | — | |
| Deployment time (msec) | 39 | | — | |
| Folding height (mm) | 30 | | 22 | |

Note:
CF* = Coefficient of friction

In Comparative Examples 51, 52, 53 and 55 in which the silicone coated fabrics each had a large coating amount, the coated fabrics showed a glossy coating surface, a poor unevenness and a high coefficient of friction, and gave a tacky touch. The airbags prepared from the silicone coated fabrics each showed a long deployment time. Although the total yarn size of the weaving yarn in Comparative Example 54 was large, and the coefficient of friction was decreased, the airbag was not compact.

In Comparative Example 56 in which the fabric had no silicone coating, the airbag was burst in a bag burst test. The fabric showed a coefficient of friction (MIU) of 0.17 in the warp direction and 0.25 in the weft direction. The coefficients of friction were slightly high compared with those of silicone coated fabrics on the uncoated surface (back side) in Examples 52 to 55. Moreover, it was found that the degree of damage to the skin of a human body caused by the contact of each of the fabrics with the skin was as large as from 62 to 70 ~S when the degree of contact damage was evaluated for damage to the keratin.

In Examples 51 to 57, the silicone coated fabrics each showed a decreased coefficient of friction not only on the coating surface but also on the uncoated surface that was the back side of the coated surface, and the airbags each showed a shortened deployment time. Moreover, the damage to keratin of the coated fabrics was evaluated to be as low as 3.8 μS and 4.2 μS on the coating surface and on the uncoated surface (back side), respectively. It was found that even when a fabric had no silicone coating layer, a silicone dip significantly suppressed damage to the skin. In Comparative Example 54, the silicone coated fabric had too large a yarn size, and a low coefficient of friction; however, a desired compact airbag was not prepared, and the airbag showed a long deployment time.

EXAMPLES 61 TO 62 AND COMPARATIVE EXAMPLES 61 TO 62

Silicone coated fabrics were prepared and evaluated in the same manner as in Example 11 except that a nylon 66 woven fabric was prepared with a rapier loom. Table 6 shows the evaluation results of the air permeability of silicone coated fabrics wherein a coating amount and an application procedure were varied.

TABLE 6

|  | Ex. 61 | | Ex. 62 | | Comp. Ex. 61 | | Comp. Ex. 62 | |
| --- | --- | --- | --- | --- | --- | --- | --- | --- |
|  | warp | weft | warp | weft | warp | weft | warp | weft |
| Weaving yarn size (dtex) | 155 | 155 | 155 | 155 | 155 | 155 | 155 | 155 |
| Single filament size (dtex/filament) | 2.9 | 2.9 | 2.9 | 2.9 | 2.9 | 2.9 | 2.9 | 2.9 |
| Weave density (ends or picks/2.54 cm) | 91 | 91 | 91 | 91 | 91 | 91 | 91 | 91 |
| Woven yarn size parameter (dtex ends (or picks)/2.54 cm) | 14105 | 14105 | 14105 | 14105 | 14105 | 14105 | 14105 | 14105 |
| METSUKE, basis of weight of fabric (g/m$^2$) | 121 | | 121 | | 121 | | 121 | |
| Total amount of coating (g/m$^2$) (Applied dope + thin layer coating) | 13 (3 + 10) | | 18 (3 + 15) | | 3 (3 + 0) | | 4 (0 + 4) | |

TABLE 6-continued

|  | Ex. 61 | | Ex. 62 | | Comp. Ex. 61 | | Comp. Ex. 62 | |
| --- | --- | --- | --- | --- | --- | --- | --- | --- |
|  | warp | weft | warp | weft | warp | weft | warp | weft |
| Max. radiation burning speed (kW/m$^2$) | 101 | | 84 | | 171 | | 143 | |
| Frazier air permeability cm$^3$/cm$^2$/sec | ≦0.1 | | ≦0.1 | | ≦0.1 | | ≦0.1 | |
| High pressure air permeability at 300 kPa (cm$^3$/cm$^2$/sec) | ≦1 | | ≦1 | | 50 | | 2 | |
| Evaluation of bag burst | No burst | | No burst | | No burst | | No burst | |
| Observation of bag damage | No problem | | No problem | | No problem | | No problem | |
| Observation of burnt-through-hole | Not observed | | Not observed | | Not observed | | Not observed | |
| Deployment time (msec) | 28 | | 29 | | 33 | | 30 | |
| maintainability of high pressure (300 kPa * 10 sec → 5 kPa * 10 sec) | ≦90% | | ≦90% | | ≦50% | | 80-90% | |

The silicone coated fabrics in Examples 61 to 62 showed air impermeability the level of which cannot be measured by Frazier method because the indication air permeability under differential pressure was below the lowerest readable limit of reading of Frazier method). Moreover, the coated fabrics showed a pressure maintainability of 90% or more when the airbags were once held at a pressure as high as 300 kPa for 10 sec and then held at a pressure of 50 kPa for 10 sec.

On the other hand, in Comparative Example 61, a base woven fabric was dip coated with a dope alone in an amount of 3 g/m$^2$. Although the coated fabric showed air impermeability by Frazier method, it showed air permeability under high pressure. Moreover, the airbag showed a long deployment time. The silicone coated fabric in Comparative Example 62 had only a thin layer coating in an amount of 4 g/m$^2$. Although the coated fabric showed slight air permeability under high pressure, it could not maintain a pressure after applying a high pressure.

EXAMPLES 71 TO 74 AND COMPARATIVE EXAMPLES 71 TO 75

Silicone coated fabrics were prepared and evaluated in the same manner as in Examples 11. A coating amount, a coating procedure and a coating composition were varied, and the results were compared. Table 7 shows the results thus obtained. Two parts of a coloring agent (trade name of Elastosil Pigment Pastes FL Red, manufactured by Wacker-Chemie GmbH, Germany) was further added to each of the coatings in order to distinguish between the front and back sides.

TABLE 7

|  | | Ex. 71 | | Ex. 72 | | Ex. 73 | | Ex. 74 | | Comp. Ex. 71 | |
| --- | --- | --- | --- | --- | --- | --- | --- | --- | --- | --- | --- |
|  | | warp | weft | warp | weft | warp | weft | warp | weft | warp | weft |
| Weaving yarn size (dtex) | | 175 | 175 | 175 | 175 | 175 | 175 | 175 | 175 | 175 | 175 |
| Single filament size (dtex) | | 3.2 | 3.2 | 3.2 | 3.2 | 3.2 | 3.2 | 3.2 | 3.2 | 3.2 | 3.2 |
| Weave density (ends or picks/2.54 cm) | | 83 | 83 | 83 | 83 | 83 | 83 | 83 | 83 | 83 | 83 |
| Woven yarn size parameter (ends dtex (or picks)/2.54 cm) | | 14525 | 14525 | 14525 | 14525 | 14525 | 14525 | 14525 | 14525 | 14525 | 14525 |
| METSUKE, basis of weight of fabric (g/m$^2$) | | 124 | | 124 | | 124 | | 124 | | 124 | |
| Total amt. of coating (g/m$^2$) (applied dope + thin layer coating) | | 7 (3 + 4) | | 9 (3 + 6) | | 13 (3 + 10) | | 18 (7 + 11) | | 3 (3 + 0) | |
| Max. radiation burning speed (kW/m$^2$) | | 136 | | 129 | | 113 | | 102 | | 198 | |
| Silicone composition additive | Applied dope | HF-3 parts | | HF-3 parts | | HF-3 parts | | HF-3 parts | | HF-3 parts | |
| | Thin layer coating | HF 3:2 3 parts | | HF 3:2 3 parts | | HF 3:2 3 parts | | HF 3:2 3 parts | | HF 3:2 3 parts | |
| Evaluation of bag burst | | No burst | | No burst | | No burst | | No burst | | No burst | |
| Observation of bag damage | | No problem | | No problem | | No problem | | No problem | | No problem | |
| Observation of burnt-through-hole | | Not observed | | Not observed | | Not observed | | Not observed | | Observed | |

TABLE 7-continued

|  | | | | |
|---|---|---|---|---|
| Deployment time (msec) | 28 | 29 | 29 | 30 | 33 |
| FMVSS burning speed (mm/min) | Self-extinguishing | Self-extinguishing | Self-extinguishing | Self-extinguishing | 120 |
| Burned distance (mm) | 43 | 39 | 35 | 25 | 254 |
| burning time (sec) | 40 | 37 | 29 | 23 | 127 |

|  | Comp. Ex. 72 | | Comp. Ex. 73 | | comp. Ex. 74 | | Comp. Ex. 75 | |
|---|---|---|---|---|---|---|---|---|
|  | warp | weft | warp | weft | warp | weft | warp | weft |
| Weaving yarn size (dtex) | 175 | 175 | 175 | 175 | 175 | 175 | 175 | 175 |
| Single filament size (dtex) | 3.2 | 3.2 | 3.2 | 3.2 | 3.2 | 3.2 | 3.2 | 3.2 |
| Weave density (ends or picks/2.54 cm) | 83 | 83 | 83 | 83 | 83 | 83 | 83 | 83 |
| Woven yarn size parameter (ends dtex (or picks)/2.54 cm) | 14525 | 14525 | 14525 | 14525 | 14525 | 14525 | 14525 | 14525 |
| METSUKE, basis of weight of fabric (g/m$^2$) | 124 | | 124 | | 124 | | 124 | |
| Total amt. of coating (g/m$^2$) (applied dope + thin layer coating) | 4 (0 + 4) | | 30 (0 + 30) | | 7 (0 + 7) | | 10 (3 + 7) Dip in modified silicone | |
| Max. radiation burning speed (kW/m$^2$) | 165 | | 91 | | 155 | | 161 | |
| Silicone composition additive — Applied dope | HF-3 parts | | HF-3 parts | | HF-3 parts | | No additives | |
| Silicone composition additive — Thin layer coating | HF 3:2 3 parts | | HF 3:2 3 parts | | HF 3:2 3 parts | | HF 3:2 3 parts | |
| Evaluation of bag burst | No burst | | No burst | | No burst | | No burst | |
| Observation of bag damage | No problem | | No problem | | No problem | | No problem | |
| Observation of burnt-through-hole | Observed | | Not observed | | Observed | | Observed | |
| Deployment time (msec) | 32 | | 34 | | 29 | | 29 | |
| FMVSS burning speed (mm/min) | 154 | | Self-extinguishing | | 131 | | 148 | |
| Burned distance (mm) | 254 | | 27 | | 254 | | 254 | |
| burning time (sec) | 99 | | 21 | | 116 | | 103 | |

The deployment time was shortened, and formation of a burnt-through-hole was suppressed in any of Examples 71 to 74 in which a woven fabric was coated with two types of silicones. A base woven fabric was coated with one type of silicone by dip coating alone in Comparative Example 71. A base woven fabric was coated with one type of silicone by knife coating alone in Comparative Example 71. The coating amount of each of the silicone coated fabrics was small, and both coated fabrics did not pass the FMVSS 302 burning evaluation. The coating amount was excessive in Comparative Example 73, and the deployment time was extended. A base woven fabric was coated with one type of silicone by knife coating alone in Comparative Example 74. The silicone coated fabric was unacceptable in burning inhibition effect, and a burnt-through-hole was observed on the base woven fabric. A base woven fabric was coated with a modified silicone that is used as a flexibilizer by dip coating in Comparative Example 75. The modified silicone was an amino-modified one (trade name of CT 95E, manufactured by Wacker-Chemie GmbH, Germany). The silicone coated fabric was insufficient for a burning inhibition effect, and did not pass the FMVSS 302 burning test. Moreover, a burnt-through-hole was observed.

Figure 5:
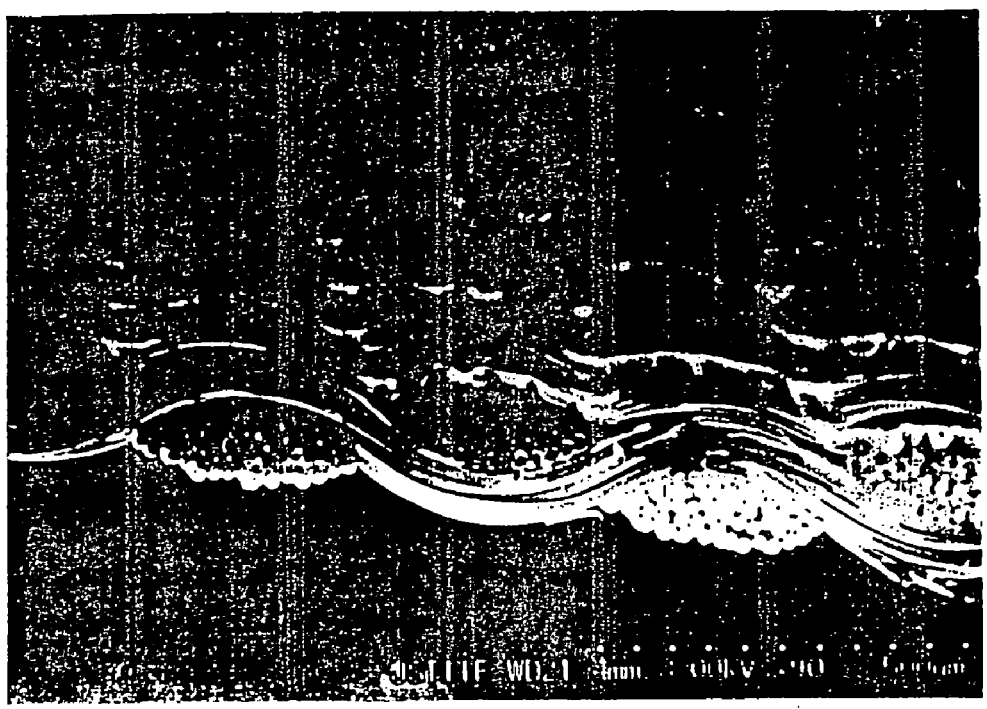
FIG. 5 is scanning electron microscopic photograph (SEM) perspectively showing a cross section and a surface shape of the coating surface of the silicone coated fabric in Example 73.

FIG. 5 is a scanning electron microscope (SEM) photograph perspectively photographed so that a cross section and the coating surface of a cross-sectional sample of the silicone coated fabric in Example 73 could be observed. The following is understood from FIG. 5: first, there is no open pores between a warp and a weft, and filaments (a warp or weft) spread over other filaments (a weft or warp) overlapping intersected woven yarn whereby covering the woven yarn beneath (the weft or warp yarn) (the weft or warp), and as a result, the warps and wefts are densely gathered to form a dense woven fabric; next, the silicone coating surface has a recessed and protruded shape that appears to have traced the ridges of the weaving yarns of the woven fabric; moreover, the silicone coating is very thin and uniform; furthermore, dip coating of silicone is not substantially found among yarns by SEM observation.

Figure 4:
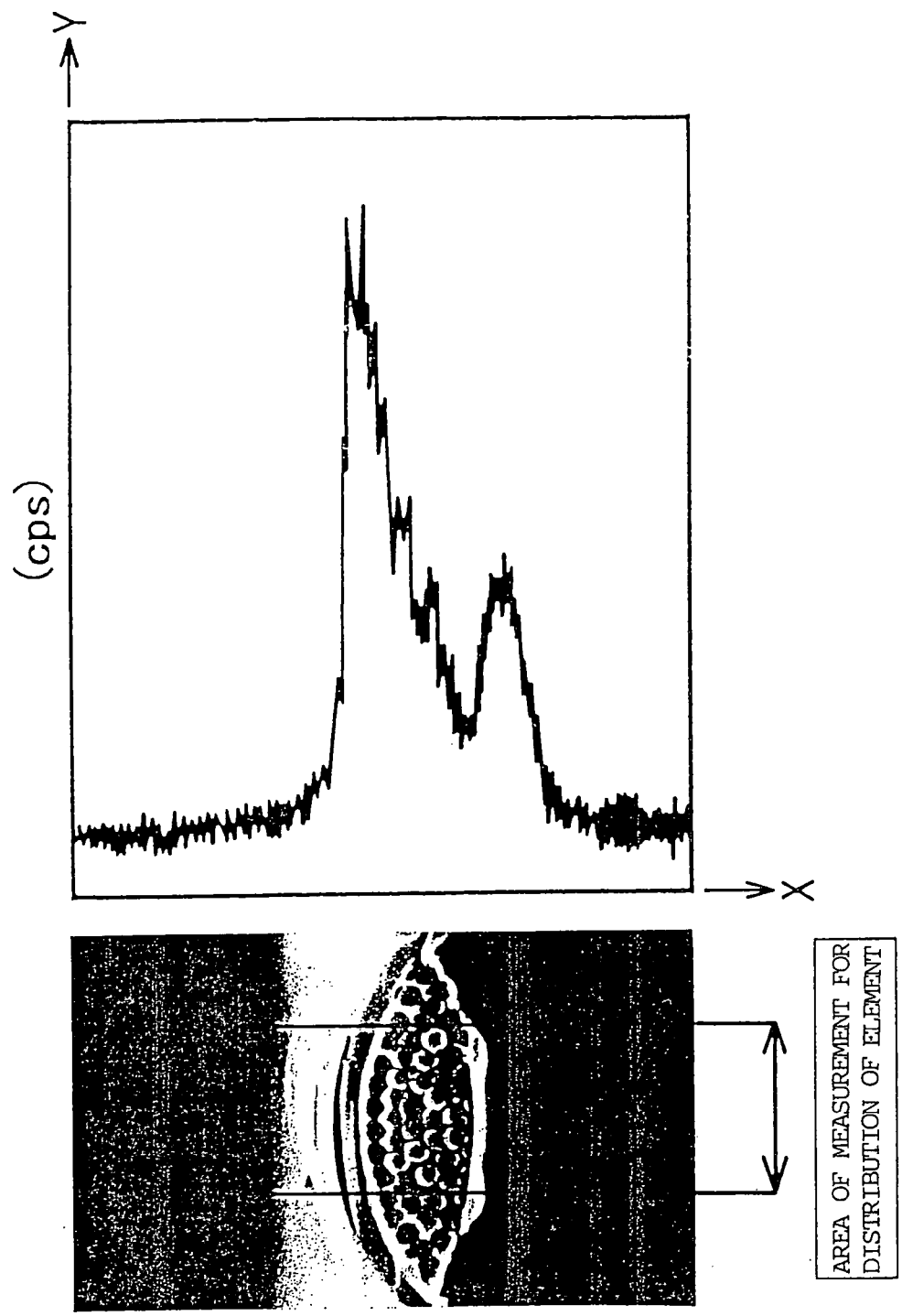
FIG. 4 shows scanning electron microscopic (SEM) photograph of a cross-section of an overlapped portion of weaving yarns in the silicone coated woven fabric in Example 73, and a chart exhibiting an XMA-Si element (Si) distribution in the cross section.

In order to carry out elemental analysis of Si of the silicone in a silicone coated fabric, the sample in Example 73 was sectioned along a weaving yarn so that the resultant cross section includes the length wise center line of the woven yarn width, Si—Kα analysis was carried out with an XMA. FIG. 4 shows the chart. The Si distribution shows a maximum peak in the coating layer portion, and a small peak is observed on the back surface of the coating. The ratio of the small peak to the maximum peak is 0.44 that corresponds to a segregated portion of a dip coating.

Similarly, FIG. 3 shows a scanning electron microscope (SEM) photograph and a chart of XMA elemental analysis of the sample in Comparative Example 74. The sample had a coating layer alone. A single peak of the Si distribution of a silicone coating layer portion alone was observed.

INDUSTRIAL APPLICABILITY

The present invention provides a soft and light silicone coated fabric prepared by coating a highly dense base woven fabric formed from a synthetic fiber having a small yarn size to form a specific texture. The coated fabric particularly shows striking effects of improving burning resistance (passing the FMVSS burning test), heat resistance, flexibility and a low coefficient of friction. A light and compact airbag that suppresses a burst starting from a burnt-through-hole, and that shortens a deployment time can be manufactured from the silicone coated fabric of the present invention.

The invention claimed is:

1. A method of producing a silicone coated fabric, which comprises coating a woven fabric that is formed from a synthetic fiber weaving yarn having a yarn size of from 100 to 270 dtex, and a woven yarn size parameter determined by a product calculated by multiplying the yarn size and a weave density (ends/2.54 cm) of from 10,000 to 25,000 (dtex·ends/2.54 cm) with silicone in an amount of from 5 to 25 g/m$^2$ by a combination of the two following applications (1) and (2) and crosslinking the silicone coating:
   (1) applying to the woven fabric a dope having a viscosity of from 0.1 to 5 Pa·s (at 25° C.) composed of a silicone composition in an amount of from 1 to 21 g/m$^2$ as a solid component; and
   (2) coating the woven fabric with a liquid silicone composition having a viscosity of from 10 to 500 Pa·s (at 25° C.) in an amount of from 4 to 24 g/m$^2$.

2. A method of producing a silicone coated fabric according to claim 1, wherein the synthetic fiber weaving yarn is mainly formed from a poly(hexamethylene adipamide), and a single filament size of the weaving yarn is from 0.5 to 4.5 dtex per filament.

3. A method of producing a silicone coated fabric according to claim 1 or 2, wherein the woven fabric is coated with the liquid silicone composition by a non-solvent procedure.

4. A silicone coated fabric produced by the method according to claim 1.

5. A silicone coated fabric according to claim 4, which shows a maximum burning speed of from 70 to 150 kW/m$^2$ in a radiation burning test using a cone calorimeter.

6. A silicone coated fabric according to claim 4, wherein a ratio of a tear strength to a weaving yarn strength according to a single tongue method is from 8 to 15 in both a warp direction and a weft direction.

7. A silicone coated fabric according to claim 4, wherein a biaxial tensile breaking strength is from 4,000 to 8,000 N/20 cm in both a warp direction and a weft direction.

8. A silicone coated fabric according to claim 4, wherein in observation by SEM of a cross section of the silicone coated fabric, a Si element distribution determined by SEM/XMA has a maximum peak and another peak showing a count having from 1/20 to 2/3 of the peak count in a central 50% portion of a site where a warp and a weft are overlapped by weaving from front and back sides.

9. The silicone coated fabric according to claim 4, wherein a coefficient of friction (MIU) measured according to KES in both a warp direction and a weft direction is from 0.05 to 0.3 on both the front and back sides of the fabric.

10. The silicone coated fabric according to claim 4, wherein an air permeation under a pressure of 300 kPA is 1.0 cm$^3$/cm$^2$/sec or less.

11. The silicone coated fabric according to claims 4, wherein the fabric shows the following results in a FMVSS 302 burning test: a) the fire goes out within 60 sec of a burning time with a burning distance of 50 mm or less; or b) the fire burns at a burning speed of 80 mm/min or less at a burnt distance (the maximum distance being of 254 mm).

12. An airbag comprising the silicone coated fabric according to any one of claims 4 to 11.

* * * * *